US012576770B2

(12) United States Patent (10) Patent No.: US 12,576,770 B2

Gil et al. (45) Date of Patent: *Mar. 17, 2026

(54) SYSTEMS, METHODS, AND APPARATUSES FOR LOADING, SHIFTING, AND STAGING OBJECTS IN AUTOMATED OR SEMI-AUTOMATED FASHION

(71) Applicant: United Parcel Service of America, Inc., Atlanta, GA (US)

(72) Inventors: Julio Gil, Veldhoven (NL); Mallory Freeman, Atlanta, GA (US)

(73) Assignee: United Parcel Service of America, Inc., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/739,905

(22) Filed: Jun. 11, 2024

(65) Prior Publication Data

US 2024/0351505 A1 Oct. 24, 2024

Related U.S. Application Data

(63) Continuation of application No. 17/878,783, filed on Aug. 1, 2022, now Pat. No. 12,036,909.

(Continued)

(51) Int. Cl.
*B60P 3/00* (2006.01)
*B60P 1/38* (2006.01)
(Continued)

(52) U.S. Cl.
CPC ................ *B60P 3/007* (2013.01); *B60P 1/38* (2013.01); *B60P 1/6427* (2013.01); *B60P 1/6436* (2013.01); *B65G 1/133* (2013.01)

(58) Field of Classification Search
CPC ......... B60P 1/38; B60P 1/4421; B60P 1/6427; B60P 1/6436; B60P 3/007; B65G 1/113; B66F 9/122
(Continued)

(56) References Cited

U.S. PATENT DOCUMENTS

| | | | |
|---|---|---|---|
| 1,506,925 A | 9/1924 | Graves et al. | |
| 2,530,341 A | 11/1950 | Satsky | |

(Continued)

FOREIGN PATENT DOCUMENTS

| | | |
|---|---|---|
| CN | 207482054 U | 6/2018 |
| CN | 112079023 A | 12/2020 |

(Continued)

OTHER PUBLICATIONS

Non-Final Office Action received for U.S. Appl. No. 17/878,802, mailed on Aug. 1, 2024, 6 pages.

*Primary Examiner* — James Keenan

(74) *Attorney, Agent, or Firm* — Shook, Hardy & Bacon L.L.P.

(57) ABSTRACT

Loading, shifting, and staging objects in automated or semi-automated fashion including systems, methods, and apparatuses for the same. The embodiments hereof enable automated and/or semi-automated loading, shifting, organizing, staging, and accessing of objects in different environments, e.g., those associated with a logistics network operation. For example, one such environment is a vehicle. In one aspect, a loading mechanism is used to load objects into a storage space of the vehicle. In another aspect, a shifting mechanism is used to shift objects in a storage space of the vehicle. In another aspect, a door assembly allows for automated opening and closing of a door into a storage space of a vehicle. In addition, methods of manufacturing and using the same are provided.

20 Claims, 23 Drawing Sheets

Related U.S. Application Data

(60) Provisional application No. 63/234,149, filed on Aug. 17, 2021.

(51) Int. Cl.
  *B60P 1/64*          (2006.01)
  *B65G 1/133*         (2006.01)

(58) Field of Classification Search
  USPC .......................... 414/331.1, 331.11, 544, 661
  See application file for complete search history.

(56)                References Cited

U.S. PATENT DOCUMENTS

| | | | |
|---|---|---|---|
| 3,749,268 | A | 7/1973 | Macomber et al. |
| 5,104,277 | A | 4/1992 | Bullock |
| 6,059,229 | A | 5/2000 | Luria |
| 10,035,447 | B2 | 7/2018 | Miles |
| 10,106,316 | B2 | 10/2018 | Munholland |
| 11,560,079 | B2 | 1/2023 | Lundeen et al. |
| 11,668,129 | B2 | 6/2023 | Singh et al. |
| 2005/0042068 | A1 | 2/2005 | Ehmen |
| 2007/0116546 | A1 | 5/2007 | Dearing |
| 2010/0329831 | A1 | 12/2010 | Tornese et al. |
| 2012/0177467 | A1 | 7/2012 | Corrigan et al. |
| 2017/0291766 | A1 | 10/2017 | Orth et al. |
| 2021/0323767 | A1 | 10/2021 | Liu et al. |
| 2022/0097970 | A1 | 3/2022 | Kiyokami |
| 2022/0297939 | A1 | 9/2022 | Chen et al. |

FOREIGN PATENT DOCUMENTS

| | | | |
|---|---|---|---|
| DE | 102018009223 | A1 | 4/2019 |
| EP | 0675059 | A2 | 10/1995 |
| GB | 2214484 | A | 9/1989 |
| JP | 60-031405 | A | 2/1985 |
| WO | 2017/018046 | A1 | 2/2017 |
| WO | 2019/037921 | A1 | 2/2019 |
| WO | 2020/007542 | A1 | 1/2020 |

2000

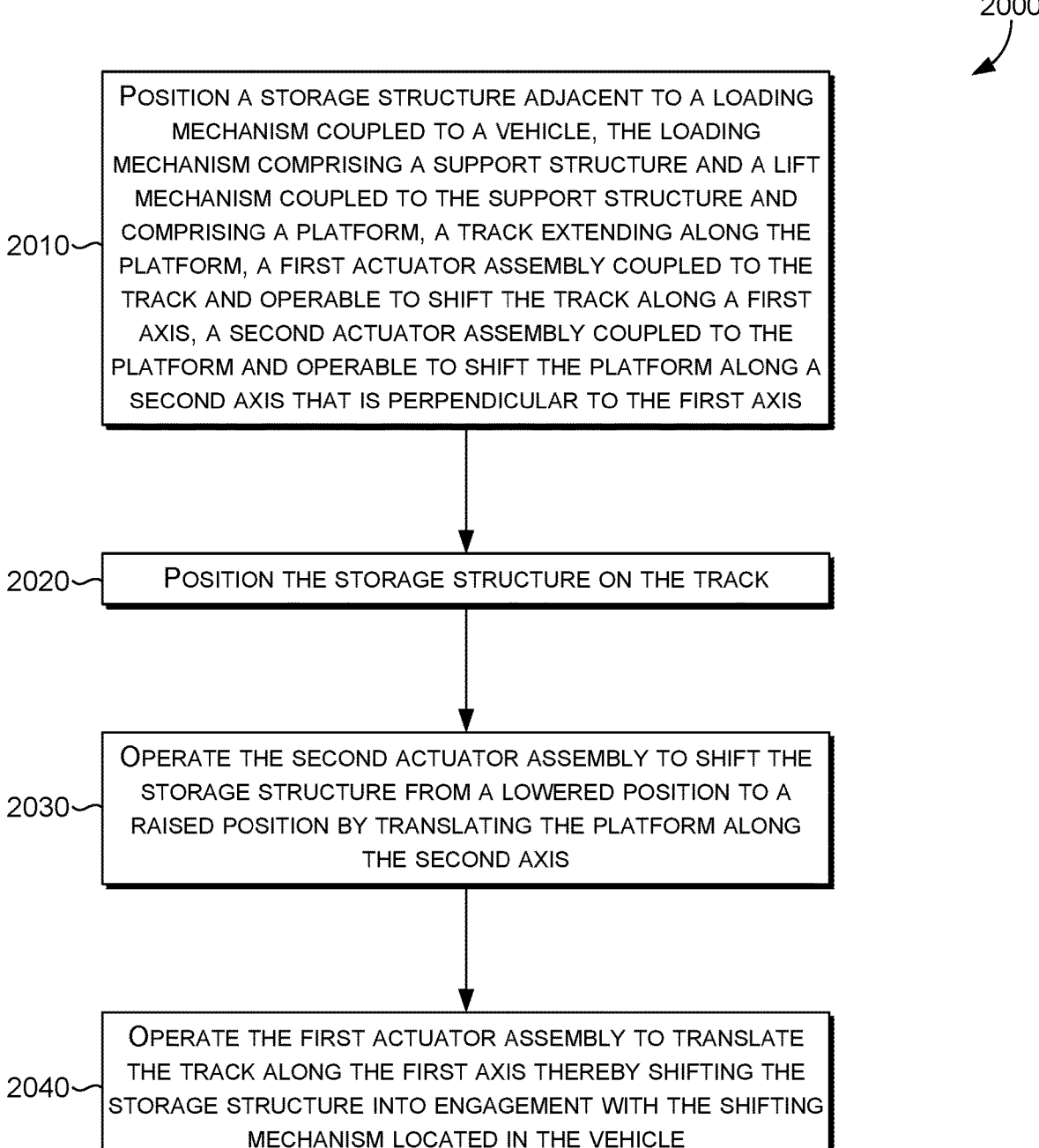

2010 — POSITION A STORAGE STRUCTURE ADJACENT TO A LOADING MECHANISM COUPLED TO A VEHICLE, THE LOADING MECHANISM COMPRISING A SUPPORT STRUCTURE AND A LIFT MECHANISM COUPLED TO THE SUPPORT STRUCTURE AND COMPRISING A PLATFORM, A TRACK EXTENDING ALONG THE PLATFORM, A FIRST ACTUATOR ASSEMBLY COUPLED TO THE TRACK AND OPERABLE TO SHIFT THE TRACK ALONG A FIRST AXIS, A SECOND ACTUATOR ASSEMBLY COUPLED TO THE PLATFORM AND OPERABLE TO SHIFT THE PLATFORM ALONG A SECOND AXIS THAT IS PERPENDICULAR TO THE FIRST AXIS

2020 — POSITION THE STORAGE STRUCTURE ON THE TRACK

2030 — OPERATE THE SECOND ACTUATOR ASSEMBLY TO SHIFT THE STORAGE STRUCTURE FROM A LOWERED POSITION TO A RAISED POSITION BY TRANSLATING THE PLATFORM ALONG THE SECOND AXIS

2040 — OPERATE THE FIRST ACTUATOR ASSEMBLY TO TRANSLATE THE TRACK ALONG THE FIRST AXIS THEREBY SHIFTING THE STORAGE STRUCTURE INTO ENGAGEMENT WITH THE SHIFTING MECHANISM LOCATED IN THE VEHICLE

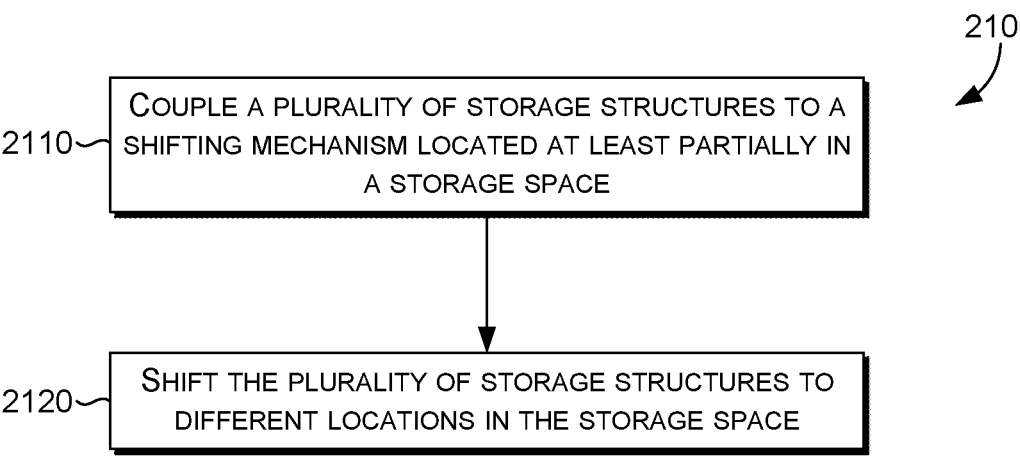

2110 ⌐ COUPLE A PLURALITY OF STORAGE STRUCTURES TO A SHIFTING MECHANISM LOCATED AT LEAST PARTIALLY IN A STORAGE SPACE

2120 ⌐ SHIFT THE PLURALITY OF STORAGE STRUCTURES TO DIFFERENT LOCATIONS IN THE STORAGE SPACE

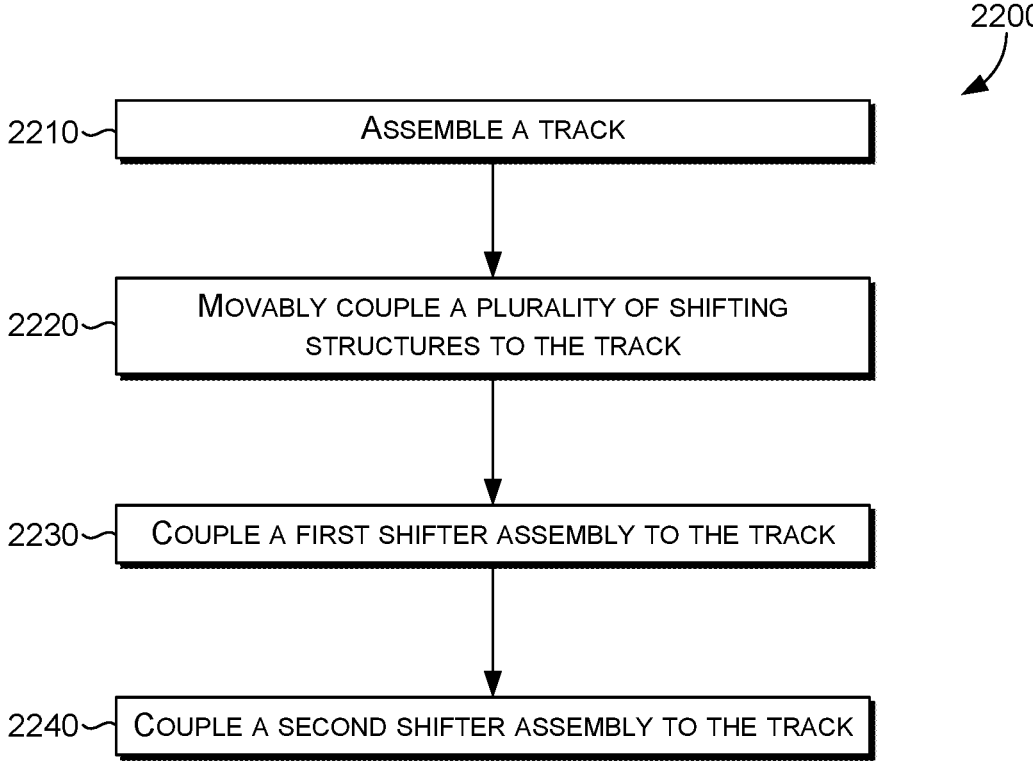

2210 ⌐ ASSEMBLE A TRACK

2220 ⌐ MOVABLY COUPLE A PLURALITY OF SHIFTING STRUCTURES TO THE TRACK

2230 ⌐ COUPLE A FIRST SHIFTER ASSEMBLY TO THE TRACK

2240 ⌐ COUPLE A SECOND SHIFTER ASSEMBLY TO THE TRACK

2310 — COUPLE A FIRST ENGAGING ELEMENT TO THE DOOR

2320 — COUPLE A DOOR-SHIFTING MECHANISM TO A FRAME, THE DOOR-SHIFTING MECHANISM COMPRISING A DISTAL END AT WHICH A SECOND ENGAGING ELEMENT IS LOCATED THAT IS MATEABLE WITH THE FIRST ENGAGING ELEMENT

2400

2410 — COUPLE A FIRST ENGAGING ELEMENT

2420 — COUPLE A DOOR-SHIFTING MECHANISM TO A FRAME

SYSTEMS, METHODS, AND APPARATUSES FOR LOADING, SHIFTING, AND STAGING OBJECTS IN AUTOMATED OR SEMI-AUTOMATED FASHION

CROSS-REFERENCE TO RELATED APPLICATIONS AND PRIORITY CLAIM

This non-provisional patent application is a continuation of co-pending U.S. patent application Ser. No. 17/878,783, filed on Aug. 1, 2022, and titled "Systems, Methods, and Apparatuses for Loading, Shifting, and Staging Objects in Automated or Semi-Automated Fashion," which claims priority to U.S. provisional patent app. no. 63/234,149, filed Aug. 17, 2021, and titled "Systems, Methods, and Apparatuses for Loading, Shifting, and Staging Objects in Automated or Semi-Automated Fashion," both of which are incorporated herein by reference in the entirety. This application is also related by subject matter to U.S. patent application Ser. No. 17/878,802, filed on Aug. 1, 2022, and U.S. patent application Ser. No. 17/878,822, filed on Aug. 1, 2022, both of which are also incorporated herein by reference in the entirety.

TECHNICAL FIELD

The field relates to object manipulation and handling.

BACKGROUND

Transporting objects, e.g., in a logistics network, presents unique challenges. For example, loading, organizing, and staging objects, e.g., in a delivery vehicle, can be complex and time consuming, and often relies on a significant amount of manual handling. This reliance on manual handling in particular may limit the speed and efficiency of such a process. Therefore, improved systems and processes for automated or semi-automated loading, shifting, and staging of objects are needed.

SUMMARY

This summary is intended to introduce a selection of concepts in a simplified form that are further described below in the detailed description section of this disclosure. This summary is not intended to identify key or essential features of the claimed subject matter, nor is it intended to be used as an aid in isolation to determine the scope of the claimed subject matter.

In brief, and at a high level, this disclosure describes, among other things, embodiments that support automated and/or semi-automated loading, shifting, staging, and handling of objects in different environments. For example, in one instance, the environment is a storage space, e.g., inside a vehicle or facility, e.g., one associated with a logistics network operation. The implementation of embodiments described herein may increase the speed, efficiency, and precision of object handling in these different environments, among other benefits. In one aspect, a loading mechanism is provided that supports automated and/or semi-automated loading of objects into a storage space, e.g., one inside a vehicle. In another aspect, a shifting mechanism is provided that supports automated and/or semi-automated shifting and staging of objects in a storage space, e.g., one inside a vehicle. In another aspect, a door assembly is provided that supports automated and/or semi-automated opening and closing, e.g., inside a vehicle. In addition to the aforementioned aspects, methods of manufacturing, retrofitting, and operating the same are also provided herein.

The term "object," as used herein, should be interpreted broadly, to include any one, or combination, of items that may be transported from one location to another. For example, in one non-limiting aspect, an "object" may be a package or parcel with contents intended for a particular destination, e.g., in a logistics network.

The term "logistics network," as used herein, should also be interpreted broadly, to include any one, or combination, of persons, equipment, locations, and/or mobile transports (e.g., vehicles, railway transports, ships, aircraft, and the like, including those that operate autonomously or semi-autonomously) used to route objects to different destinations.

The term "storage structure," as used herein, should also be interpreted broadly, to include any structure suitable for receiving and supporting one or more objects during transport. For example, a storage structure may be a rack, cart, or other upright structure that is capable of holding, supporting, storing, and/or securing one or more objects for transport.

BRIEF DESCRIPTION OF THE DRAWINGS

The embodiments presented in this disclosure used for loading, shifting, and/or staging objects in automated or semi-automated fashion are described in detail below with reference to the attached drawing figures, which are intended to illustrate non-limiting examples, wherein:

FIG. 20 depicts a block diagram of a method of loading a storage structure into a vehicle using a loading mechanism, in accordance with an embodiment hereof;

FIG. 21 depicts a block diagram of a method of shifting storage structures in a storage space, in accordance with an embodiment hereof;

FIG. 22 depicts a block diagram of a method of manufacturing a shifting mechanism, in accordance with an embodiment hereof;

DETAILED DESCRIPTION

Figure 1:
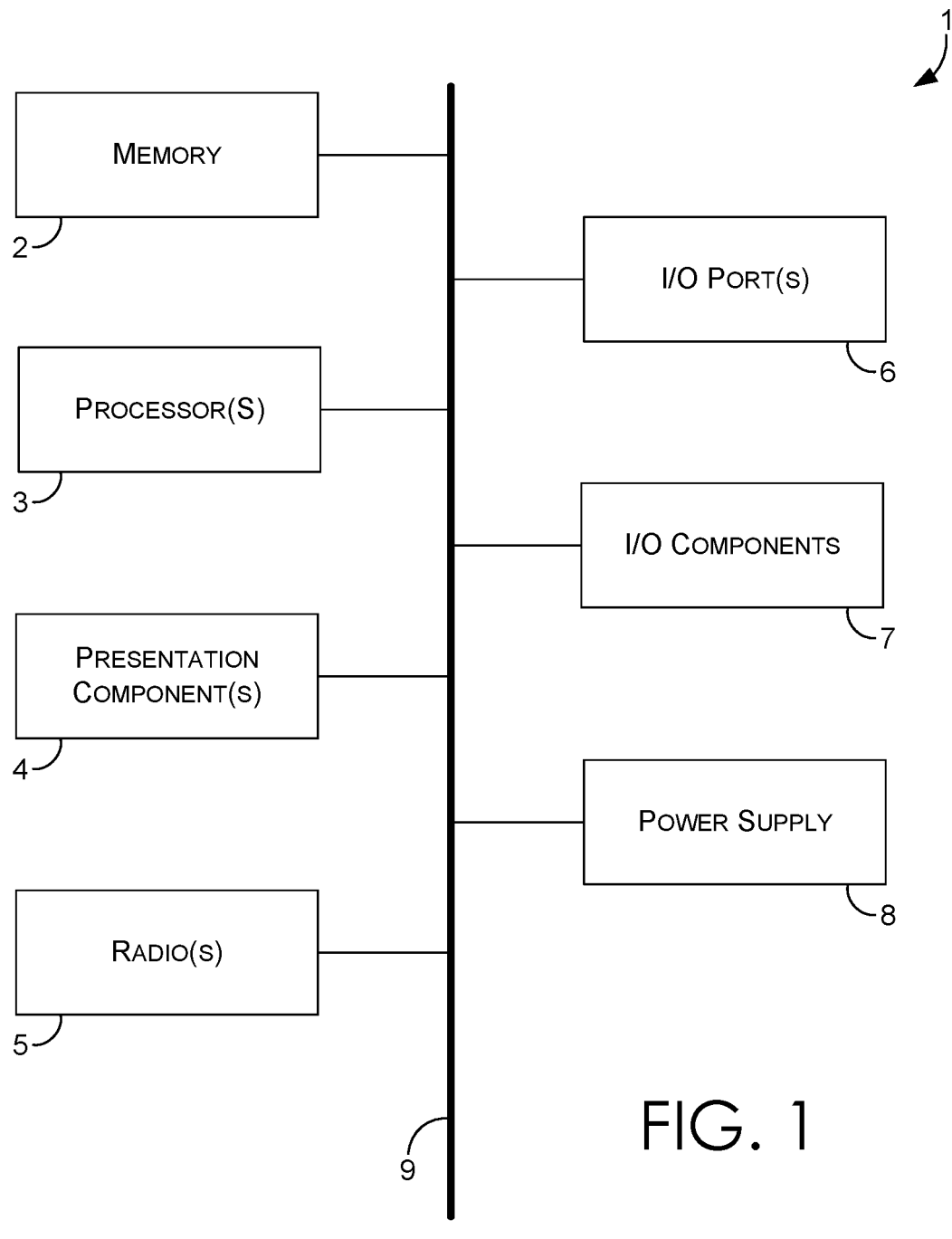
FIG. 1 depicts an example computing system suitable for supporting operation of different embodiments described herein.

This detailed description is provided in order to meet statutory requirements. However, this description is not intended to limit the scope of the invention disclosed herein. Rather, the claimed subject matter may be embodied in other ways, to include different steps, combinations of steps, different elements, and/or different combinations of elements, similar to those described in this disclosure, and in conjunction with other present and future technologies. Moreover, although the terms "step" and "block" may be used herein to identify different elements of methods employed, the terms should not be interpreted as implying any particular order among or between different elements except when the order is explicitly stated.

In general, this disclosure describes embodiments that support automated and/or semi-automated loading, shifting, staging, and/or handling of objects in different environments. In one embodiment, a loading mechanism is provided. The loading mechanism may be used to load objects into a storage space, e.g., through automated and/or semi-automated operation. In another embodiment, a shifting mechanism is provided. The shifting mechanism may be used to shift and stage objects in a storage space, e.g., through automated and/or semi-automated operation. In another embodiment, a door assembly is provided. The door assembly may be used to engage, open, and/or close doors, e.g., inside a vehicle, e.g., through automated and/or semi-automated operation. In addition, methods of manufacturing, retrofitting, and operating the same are also disclosed herein. Examples of the aforementioned embodiments are described in detail below with reference to FIGS. 1-24.

The subject matter described herein may be implemented as a method, a system, and/or a computer-program product, among other things. Accordingly, certain aspects may take the form of hardware, or software, or may be a combination of software and hardware. A computer-program that includes computer-useable instructions embodied on one or more computer-readable media may also be implemented. The subject matter may further be implemented as hard-coded into the mechanical design of computing components and/or may be built into a system, apparatus, and/or device for loading, shifting, staging, and/or handling objects, e.g., through automated and/or semi-automated operation.

The computer-readable media described herein may include volatile media, non-volatile media, removable media, or non-removable media, and may also include media readable by a database, a switch, and/or various other network devices. Network switches, routers, and related components are conventional in nature, as are methods of communicating with the same, and thus, further elaboration is not provided here. By way of example, and not limitation, computer-readable media may comprise computer storage media and/or non-transitory communications media.

The computer storage media, or machine-readable media, described herein may include media implemented in any method or technology for storing information. Examples of stored information may include computer-useable instructions, data structures, program modules, and/or other data representations. Computer storage media may include, but is not limited to, RAM, ROM, EEPROM, flash memory or other memory technology, CD-ROM, digital versatile discs (DVD), holographic media or other optical disc storage, magnetic cassettes, magnetic tape, magnetic disk storage, and other storage devices. These memory components may store data momentarily, temporarily, and/or permanently, and are not limited to the examples provided in this section.

Looking at FIG. 1, a block diagram of an example computing device 1 suitable for supporting the operations described herein is provided, in accordance with an embodiment hereof. It should be understood that, although some components depicted in FIG. 1 are shown in the singular, they may be plural, and the components may be connected in a different, e.g., local or distributed, configuration. For example, computing device 1 might include multiple processors and/or multiple radios. As shown in FIG. 1, computing device 1 includes a bus 9 that may directly or indirectly connect different components together, including memory 2, processor(s) 3, presentation component(s) 4 (if applicable), radio(s) 5, input/output (I/O) port(s) 6, input/output (I/O) component(s) 7, and power supply 8.

The memory 2 may take the form of the memory components described herein. Thus, further elaboration will not be provided here, but memory 2 may include any type of tangible medium that is capable of storing information, such as a database. The database may include any collection of records, data, and/or other information. In one embodiment, memory 2 may include a set of computer-executable instructions that, when executed, perform different functions or steps described herein. These instructions will be referred to as "instructions" or an "application" for short. The processor 3 may actually be multiple processors that may receive instructions and process them accordingly. The presentation component 4 may include a display, a speaker, a screen, a portable digital device, and/or other components that may present information through visual, auditory, and/or other tactile cues (e.g., a display, a screen, a lamp, a light-emitting diode (LED), a graphical user interface (GUI), and/or a lighted keyboard).

The radio 5 may support communication with a network, and may additionally or alternatively facilitate different types of wireless communications, such as Wi-Fi, WiMAX, LTE, Bluetooth, VOIP communications, and/or 5G communications, among other communication protocols. In various aspects, the radio 5 may be configured to support multiple technologies, and/or multiple radios may be configured and utilized to support multiple technologies.

The input/output (I/O) ports 6 may take a variety of forms. Example I/O ports may include a USB jack, a stereo jack, an infrared port, a USB-C port, and/or other proprietary or standardized communication ports. The input/output (I/O) components 7 may comprise one or more keyboards, microphones, speakers, touchscreens, and/or any other item useable to directly or indirectly send inputs to the computing device 1. The power supply 8 may comprise batteries, generators, fuel cells, and/or any other component(s) that acts as a power source to supply power to computing device 1 and to any other components described herein.

Figure 2:
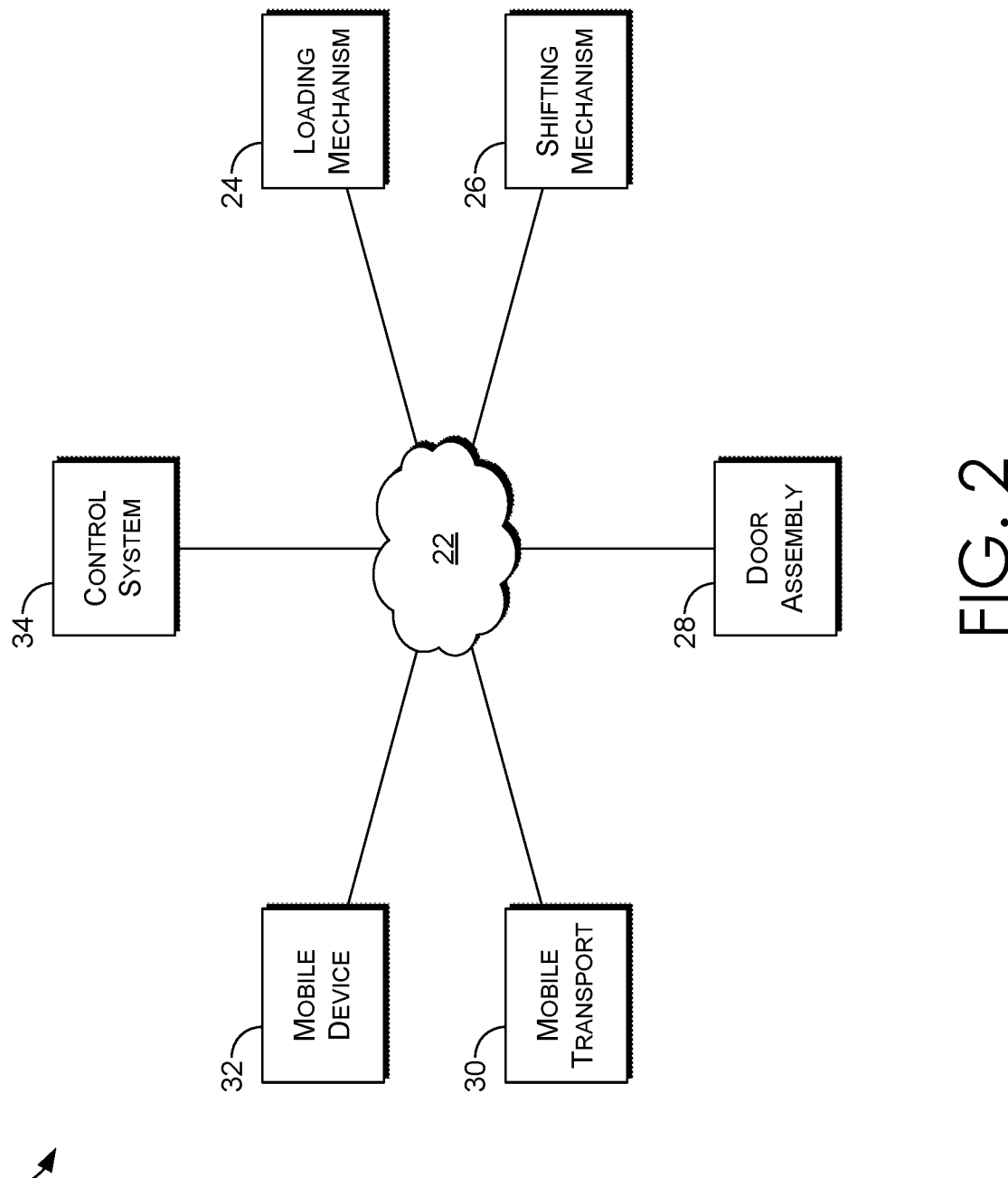
FIG. 2 depicts a diagram of an example network of components that support different loading, shifting, and staging operations, in accordance with an embodiment hereof.

Looking at FIG. 2, a system 20 with components 24, 26, 28, 30, 32, 34 that support loading, shifting, staging, and/or handling of objects, e.g., in automated and/or semi-automated fashion, is shown, in accordance with an embodiment hereof. The components 24, 26, 28, 30, 32, 34 are interconnected over a network 22, and may be local, or distributed, or a combination thereof. The selection of components 24, 26, 28, 30, 32, 34 shown in FIG. 2 is intended to represent merely one example, and numerous other combinations are contemplated herein.

The system 20 shown in FIG. 2 includes a control system 34. The control system 34 may monitor, control, and/or direct operation of different components of the system 20. In one aspect, the control system 34 may individually control elements of the system 20. In another aspect, the control system 34 may control multiple elements of the system 20 thereby allowing them to operate in coordination (e.g., to perform associated tasks in combination or in sequence). The components 24, 26, 28, 30, 32 shown in FIG. 2 may be controlled locally, remotely, and/or through a distributed configuration, in different embodiments. The control system 34 may include computing components, processors, and/or systems that monitor, direct, and/or otherwise operate to control the components of the system 24, 26, 28, 30, 32, either separately, or in coordination, as described herein.

The system 20 shown in FIG. 2 includes a loading mechanism 24. The loading mechanism 24 includes components that enable it to engage, support, lift, and translate objects, e.g., storage structures, e.g., into a storage space or staging area. The loading mechanism 24 may be installed in a facility, or in a mobile transport, such as a delivery vehicle, among other locations. The loading mechanism 24 may include, in different embodiments, tracks, guides, actuators, sensors, control systems, power sources, and/or other components that support its operation. The loading mechanism 24 may also be coupled, directly or indirectly, to a shifting mechanism, e.g., the shifting mechanism 26 shown in FIG. 2. In such configurations, the loading mechanism 24 can exchange objects, e.g., storage structures, with the shifting mechanism 26. In one embodiment, the control system 34 may direct operation of the loading mechanism 24, among other components of the system 20.

The system 20 shown in FIG. 2 also includes a shifting mechanism 26. The shifting mechanism 26 includes components that enable it to engage, support, and shift objects, e.g., storage structures, e.g., in a storage space or staging area. The shifting mechanism 26 may be installed in a vehicle, or in a facility, among other locations. The shifting mechanism 26 may, in different embodiments, include tracks, actuators, mechanisms, sensors, control components, power components, drive systems, and/or other mechanical, electrical, and/or pneumatic components that allow it to shift objects to different locations in a storage space or staging area. In some embodiments, the shifting mechanism 26 is configured to interact with other components/systems. For example, the shifting mechanism 26 may include an interface that enables interaction with the loading mechanism 24. The interface may allow objects, e.g., storage structures, to be transferred between the loading mechanism 24 and the shifting mechanism 26. In one embodiment, the control system 34 may direct operation of the shifting mechanism 26, among other components of the system 20.

The system 20 shown in FIG. 2 also includes a door assembly 28. The door assembly 28 can be operated to open and close a door, e.g., in automated or semi-automated fashion. The door assembly 28 may include, in different embodiments, tracks, frames, engaging elements, sensors, actuators, and/or other mechanical, electrical, and/or pneumatic components that operate to open and close a door, or multiple doors, e.g., in automated or semi-automated fashion. The door assembly 28 may be located in a mobile transport, e.g., a vehicle, e.g., being located at a bulkhead of the vehicle between a cab and a storage space. In this respect, the door assembly 28 may be implemented in any type of mobile transport, e.g., a vehicle, ship, railway transport, or aircraft. In one embodiment, the control system 34 may direct operation of the door assembly 28, among other components of the system 20.

In one embodiment, the loading mechanism 24, the shifting mechanism 26, and/or the door assembly 28 may operate in coordination, thereby enabling coordinated loading, shifting, and staging/accessing of objects using the system 20.

In another embodiment, the loading mechanism 24, the shifting mechanism 26, and/or the door assembly 28 may operate, or be directed to operate, e.g., by the control system 34, based on a geographic location or planned geographic location of the vehicle.

The system 20 shown in FIG. 2 also includes a mobile transport 30. The mobile transport 30 may be a vehicle, ship, aircraft, railway transport, or another type of mobile transport. In one embodiment, the mobile transport 30 may be one that operates in connection with a logistics network. The mobile transport 30, in different aspects, may have incorporated therein, or integrated therewith, any of the components 24, 26, 28, 32, 34 described in connection with FIG. 2. In different aspects, the mobile transport 30 may be manually operated, autonomously operated, or semi-autonomously operated, e.g., being directed, at least in part, by a computing device. In one aspect, operation of the mobile transport 30 or operation of the components 24, 26, 28, 32, 34, may be controlled, at least in part, by the control system 34.

The system 20 shown in FIG. 2 also includes a mobile device 32. The mobile device 32 may be used in connection with the components 24, 26, 28, 30, 34 of the system 20. For example, in one aspect, the mobile device 32 may interact with the control system 34 to control operation of the components 24, 26, 28, 30, 34. The mobile device 32 may be at least partially integrated with the mobile transport 30, or distinct, e.g., being portable.

Figure 3:
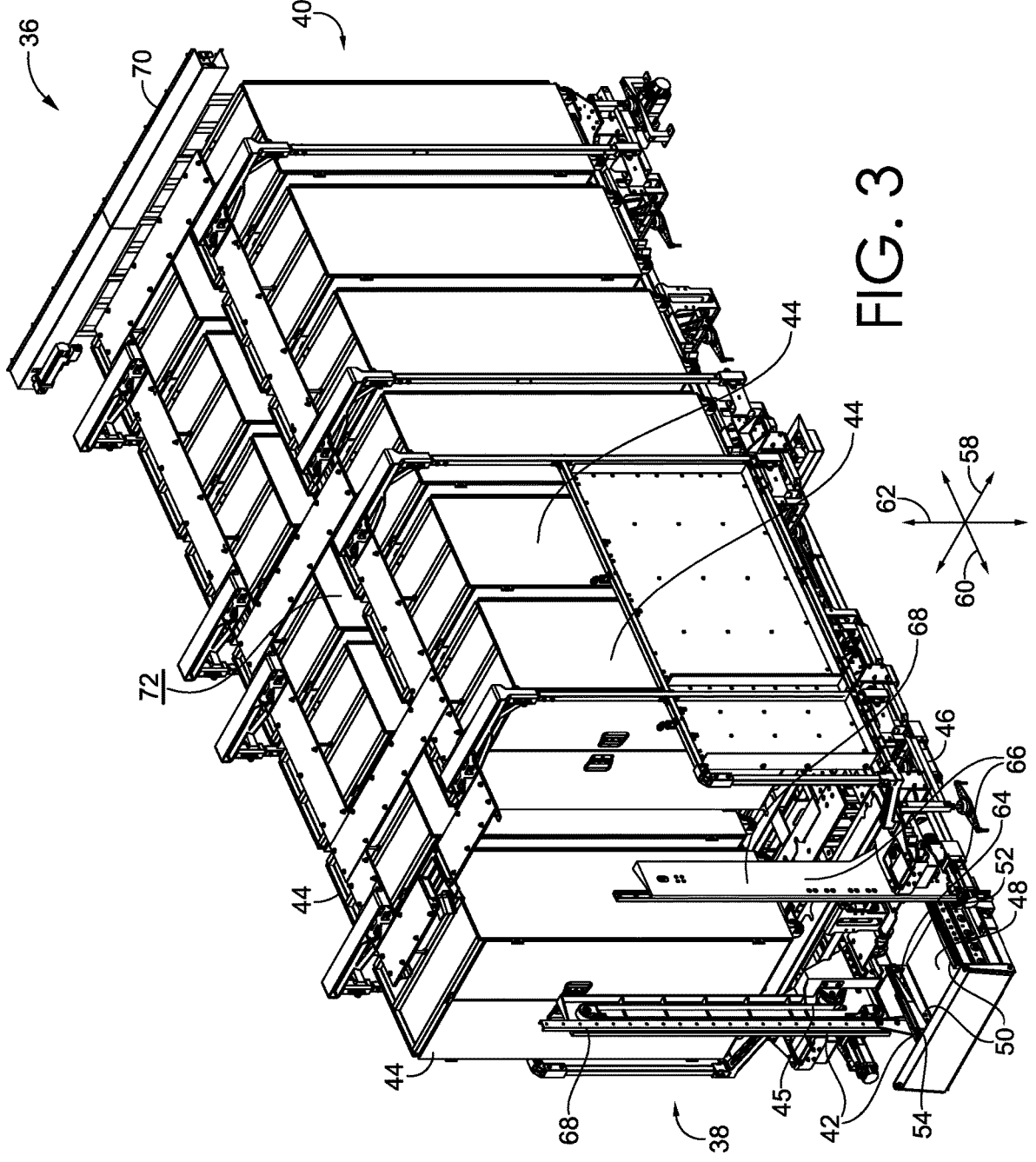
FIGS. 3-5 depict an example system used for shifting objects, in accordance with an embodiment hereof.
Figure 4:
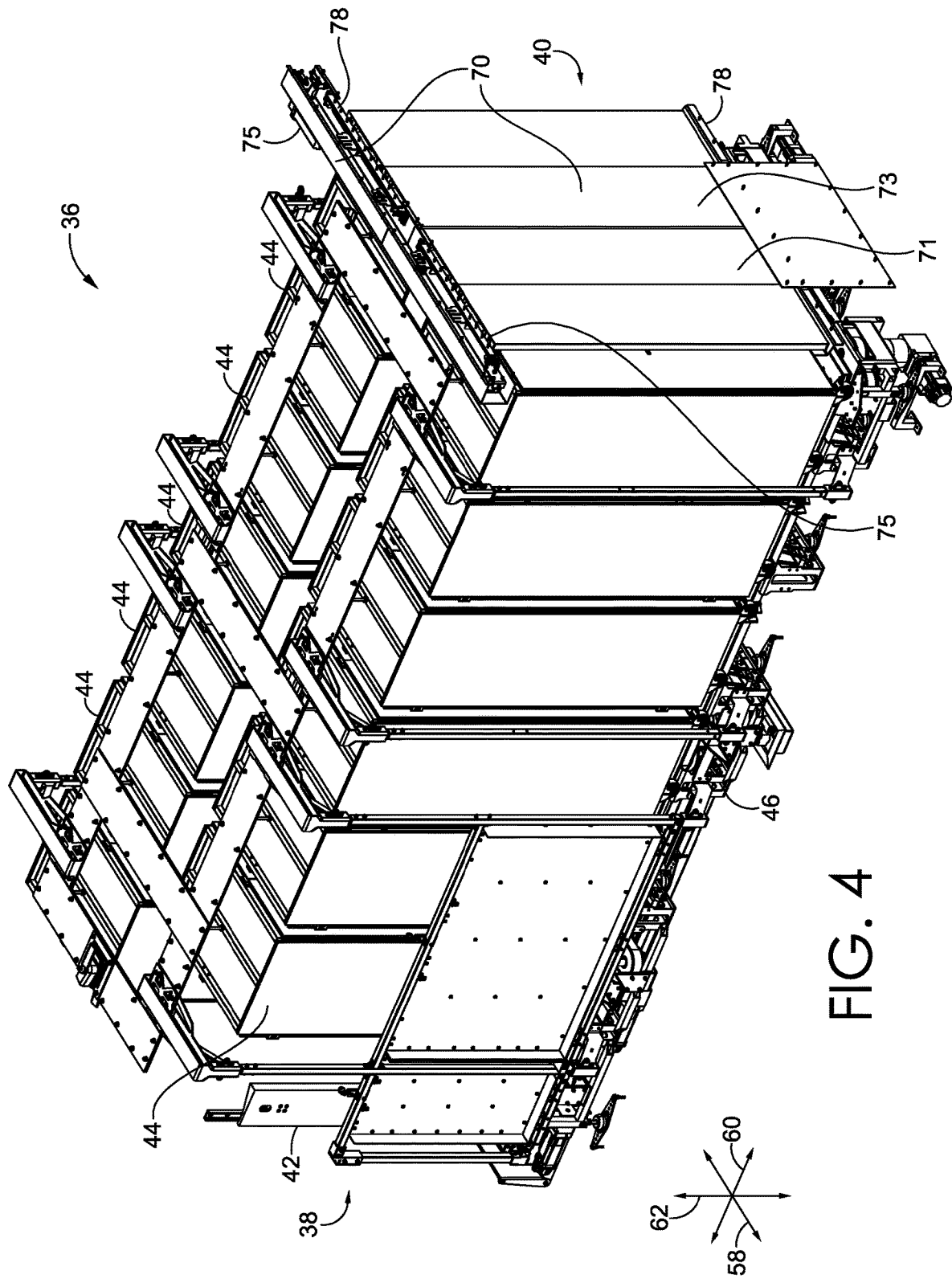
Figure 5:
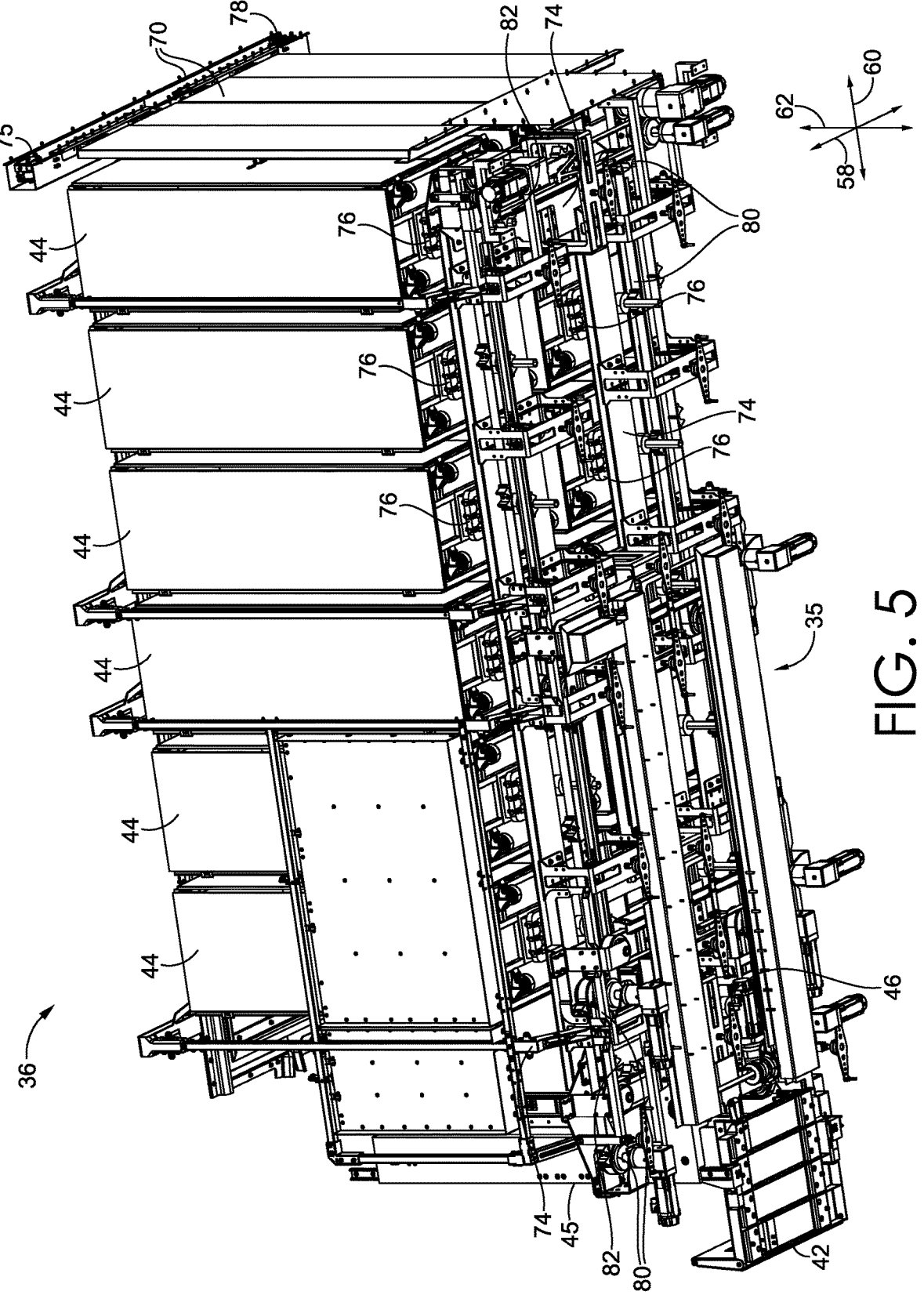

Looking at FIGS. 3-5, a system 36 for loading, shifting, and staging objects is provided, in accordance with an embodiment hereof. FIG. 3 primarily depicts one end 38 of the system 36. FIG. 4 primarily depicts an opposite end 40 of the system 36. FIG. 5 primarily depicts an underside 35 of the system 36. In one instance, the system 36 may be used in a logistics network. For example, the system 36 may be incorporated into a mobile transport, e.g., a delivery vehicle, e.g., one that operates in the logistics network. The system 36 is configured to receive, shift, and stage a plurality of storage structures 44, as shown in FIGS. 3-5. The storage structures 44 may be used to transport objects, e.g., parcels or packages, to designated destinations, e.g., in the logistics network. The system 36 shown in FIGS. 3-5 is intended to represent one example configuration. However, many other configurations are contemplated herein.

Looking specifically at FIG. 3, a loading mechanism 42 is shown, in accordance with an embodiment hereof. The loading mechanism 42 is located at the end 38 of the system 36. The loading mechanism 42 is designed to receive a storage structure 44, lift the storage structure 44 to an elevated position, and then shift the storage structure 44 into engagement with a shifting mechanism 46 coupled to the loading mechanism 42. To enable this, the loading mechanism 42 includes a platform 48 with a track 50. The track 50 includes a pair of elongated track elements 52, 54. The elongated track elements 52, 54 are spaced apart on the platform 48. The loading mechanism 42 also includes a lift mechanism 45 that has an actuator assembly 64 (shown most clearly in FIGS. 11-13). The actuator assembly 64 is operable to shift the track 50, and in particular the track elements 52, 54, along an axis 60, i.e., toward and away from the shifting mechanism 46. The loading mechanism 42 also includes an actuator assembly 66 (shown most clearly in FIGS. 11-13). The actuator assembly 66 is operable to shift the platform 48 along an axis 62, i.e., up and down relative to the shifting mechanism 46. The axis 62 is generally perpendicular to the axis 60. The actuator assembly 66 allows a storage structure 44 supported on the platform 48 to be raised toward the shifting mechanism 46, and the actuator assembly 64 allows the raised storage structure 44 to be shifted into engagement with the shifting mechanism 46. The loading mechanism 42 also includes a storage structure 68 extending generally upward along the axis 62. The storage structure 68 supports the platform 48 and the actuator assemblies 64, 66. In addition, while not depicted, a control system may be connected to the loading mechanism 42 and components thereof. The control system may be used to control operation of the loading mechanism 42, e.g., in coordination with other components of the system 36.

Looking at FIG. 4, the other end 40 of the system 36 is shown, in accordance with an embodiment hereof. FIG. 4 depicts a door assembly 70 that forms part of the system 36. The door assembly 70 is coupled to the shifting mechanism 46 at the end 40, opposite to the loading mechanism 42. The door assembly 70 has a pair of movable doors 71, 73. The door assembly 70 further includes a door-engaging mechanism 75 (which is partially obscured in FIG. 4) coupled to the doors 71, 73. The doors 71, 73 are depicted as sliding doors that are mounted on a track 78. The door-engaging mechanism 75, depending on the configuration, may be operable to engage and shift, e.g., open and close, the doors 71, 73, e.g., in automated or semi-automated fashion, as described in detail in connection with FIGS. 14-18.

Looking specifically at FIG. 5, an underside of the system 36 is shown, in accordance with an embodiment hereof. FIG. 5 shows the configuration of the shifting mechanism 46 in detail. The shifting mechanism 46 includes multiple components that operate in coordination to reposition the storage structures 44 at different locations. In addition, the shifting mechanism 46 is also designed to interact with the loading mechanism 42, e.g., by receiving, engaging, and then shifting storage structures 44 provided by the loading mechanism 42, and is further designed to interact with the door assembly 70, e.g., by staging storage structures 44 at the door assembly 70. The shifting mechanism 46 may be directed by a control system, e.g., as described in connection with FIG. 2. In different embodiments, the control system may be local to the system 36 or remote from the system 36, or some combination thereof.

Looking still at FIGS. 3-5, it can be seen that the shifting mechanism 46 includes a track 74 and a plurality of shifting structures 76. The plurality of shifting structures 76 are coupled to, and are translatable along, the track 74. In addition, each shifting structure 76 is designed to support and secure a storage structure 44, e.g., one introduced by the loading mechanism 42. In this respect, the shifting structures 76 each include components and/or mechanisms that enable releasable securement of the storage structures 44 thereon. The shifting mechanism 46 further includes a shifter assembly 80 and a shifter assembly 82. The shifter assembly 80 is operable to shift the plurality of shifting structures 76 along the axis 60, as identified in FIGS. 3-5. The shifter assembly 82 is operable to shift the plurality of shifting structures 76 along the axis 58, as identified in FIGS. 3-5. As shown in FIGS. 3-5, the axis 58 and the axis 60 are generally perpendicular to each other. This orientation of the shifter assemblies 80, 82 allows the shifting structures 76, and any storage structures 44 mounted thereon, to translate in different directions within the system 36. To enable this multi-directional shifting, the shifting structures 76 are able to transfer between the shifter assembly 80 and the shifter assembly 82 during operation of the shifting mechanism 46. This process is described in detail in connection with FIGS. 8-10.

In one embodiment, the system 36, including the loading mechanism 42, the shifting mechanism 46, and the door assembly 70 are directed by a control system. Depending on the configuration, the control system may direct operation of the components individually, or in coordination (e.g., allowing for simultaneous operation and interaction).

In another embodiment, a control system may direct operation of the loading mechanism 42, the shifting mechanism 46, and/or the door assembly 70 based on a geographic location of the system 36, or a geographic location of a mobile transport that incorporates the system 36. For example, the geographic location of a mobile transport, e.g., delivery vehicle, may be determined using a global positioning system ("GPS"), wireless communication system, telematics, and/or another location-tracking technology or system. Based on the location information, the control system may direct the system 36 to perform different operations. For example, when approaching a particular location, the shifting mechanism 46 may operate to shift a particular storage structure 44 to the door assembly 70, e.g., to allow a delivery driver to quickly and easily access objects stored on the storage structure 44.

Figure 6:
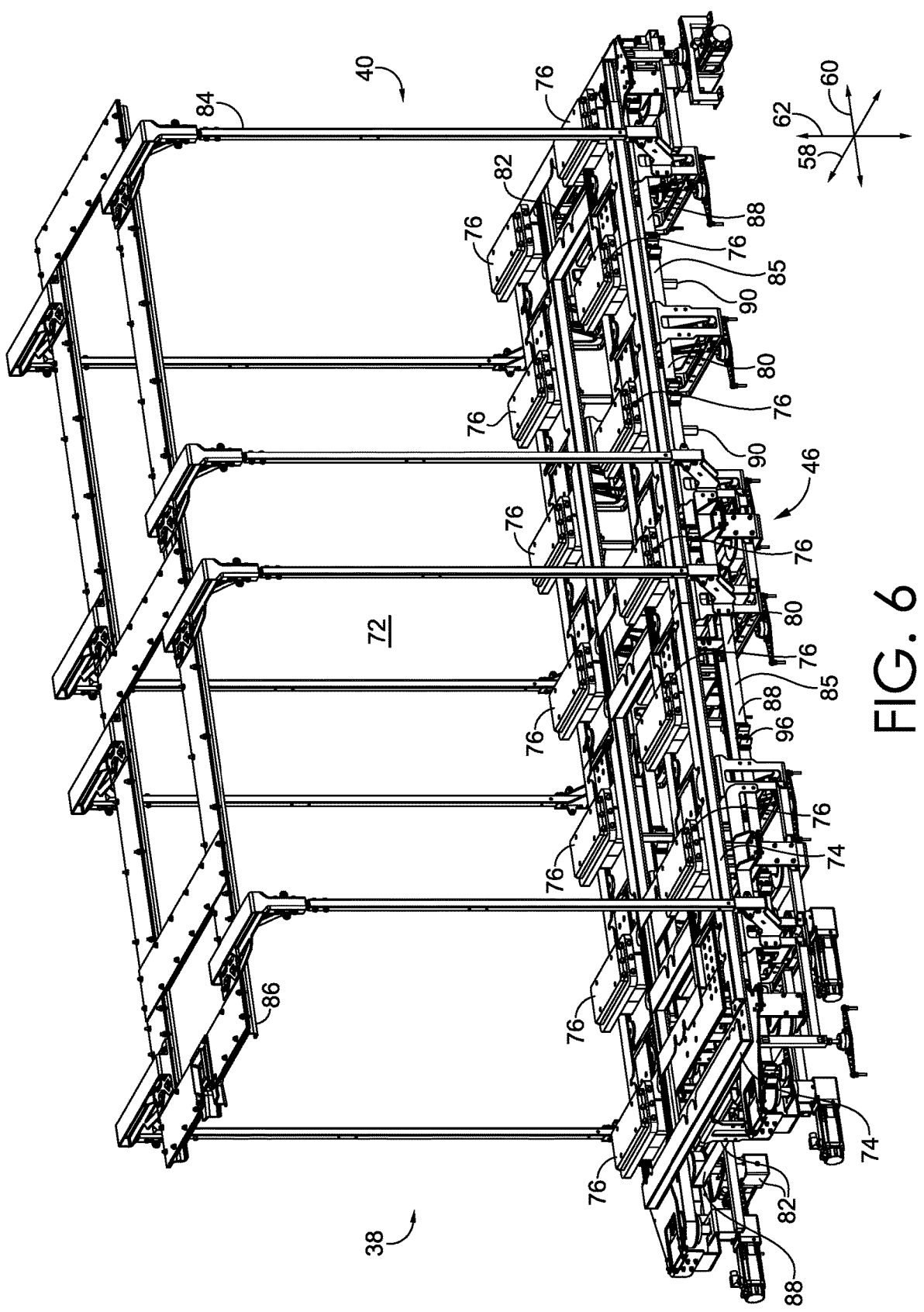
FIG. 6 depicts part of the system of FIGS. 3-5, showing in particular a shifting mechanism, in accordance with an embodiment hereof.

Looking at FIG. 6, the shifting mechanism 46 initially shown in FIGS. 3-5 is depicted in isolation, in accordance with an embodiment hereof. FIG. 6 shows how the track 74 extends throughout a staging area 72. The staging area 72 is sized to accommodate the storage structures 44 when mounted on the shifting structures 76, providing sufficient room such that the storage structures 44 can shift around the staging area 72 during operation of the shifting mechanism 46. The staging area 72 is also enclosed by a frame 84. In different embodiments, the frame 84 may be integrated with, and/or form part of, a mobile transport, e.g., a delivery vehicle. The frame 84 includes a track 86 positioned opposite to the track 74. The tracks 74, 86 may be used in combination to support, enclose, and guide the storage structures 44 about the staging area 72, e.g., securely during transit of an associated mobile transport.

FIG. 6 also depicts the shifter assemblies 80, 82 in detail. The shifter assemblies 80, 82 are located adjacent, e.g., directly below, the track 74. The shifter assembly 80 extends across opposite sides of the shifting mechanism 46, generally along the axis 60. The shifter assembly 82 extends across the shifting mechanism 46 generally along an orthogonal axis, i.e., along the axis 58. The shifter assemblies 80, 82 each translate their respective components along these axes 58, 60 to impart translation forces along such axes 58, 60. In this respect, the shifter mechanism 80, and the shifter mechanism 82, each include a plurality of individual sub-mechanisms that operate to translate their associated components along a common axis, e.g., along the axis 60 for the shifter assembly 80, or along the axis 58 for the shifter assembly 82. In the embodiment shown in FIG. 6, each individual mechanism is a belt-driven mechanism 88. However, different mechanisms that utilize different mechanical, electrical, and/or pneumatic components are also contemplated herein. In addition, in different embodiments, each shifter assembly 80, 82 may include any number of belt-driven mechanisms 88 that extend along the common axis 58 or 60, in spaced relation. This number may be selected based on the desired cross-shifting capability within the system.

The belt-driven mechanisms 88 of the shifting mechanism 46 may be located adjacent, e.g., directly below, the track 74, as shown in FIG. 6. The belt-driven mechanisms 88 shown in FIG. 6 each include a belt 85 and a plurality of engaging elements 96 (e.g., structures having a recess, indentation, or feature that is C-shaped or U-shaped) mounted on the belt 85. During operation of a belt-driven mechanism 88, the belt 85 is translated in a continuous fashion, e.g., over powered or idling rollers. This, by association, translates the plurality of engaging elements 96 mounted on the belt 85 along the corresponding axis of operation, e.g., the axis 60 for the shifter mechanism 80, or the axis 58 for the shifter mechanism 82. The shifting structures 76 each include an elongated extension 90 that extends toward the shifter assemblies 80, 82. The elongated extension 90 is configured so that it can be received in any of the plurality of engaging elements 96. The elongated extension 90 can therefore engage with a plurality of engaging elements 96, and after doing so, be shifted by the associated belt-driven mechanism 88 along the corresponding axis of operation, e.g., the axis 60 for the shifter assembly 80, or the axis 58 for the shifter assembly 82. This process is described in further detail in connection with FIGS. 8-10.

Figure 7A:
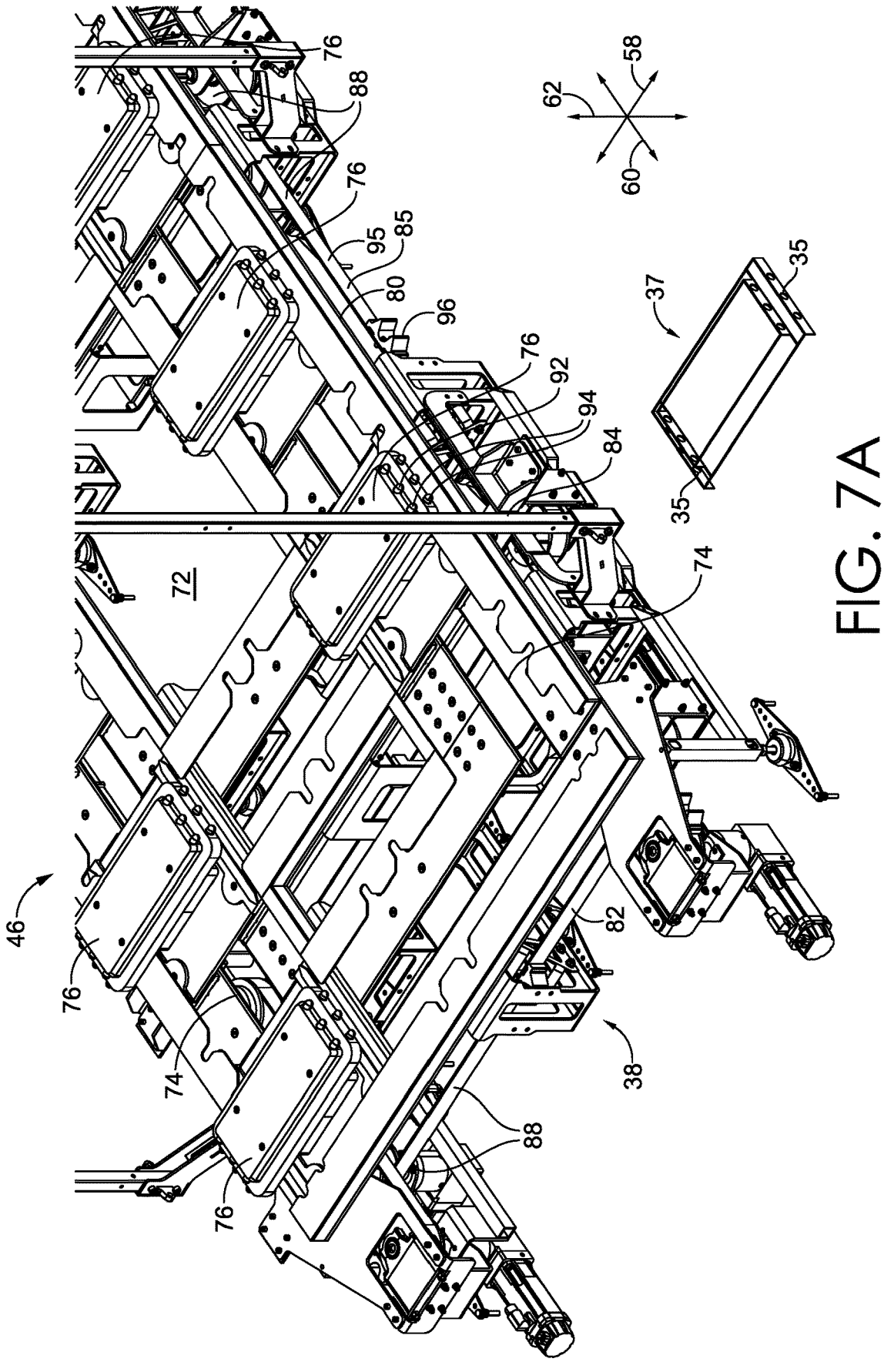
FIGS. 7A-7B depict part of the shifting mechanism shown in FIG. 6 as well as components thereof, in accordance with embodiments hereof.
Figure 7B:
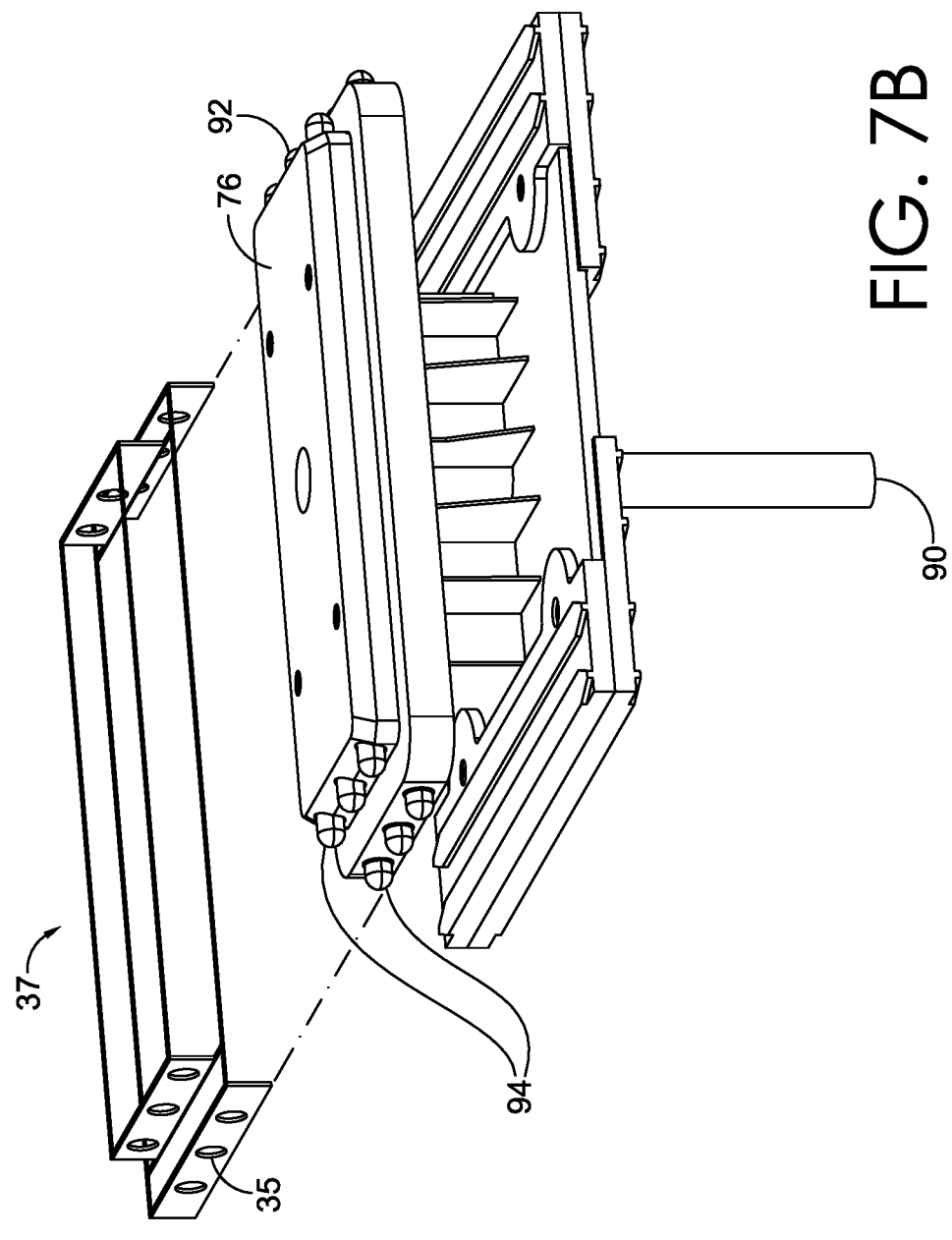

Looking at FIGS. 7A-7B, part of the shifting mechanism 46 shown in FIG. 6 is provided, in accordance with an embodiment hereof. FIG. 7A depicts part of the track 74, showing how it extends around the staging area 72. FIG. 7A also depicts the shifting structures 76 that translate along the track 74 during operation of the shifting mechanism 46. FIG. 7A also depicts part of the shifter assembly 80 and the shifter assembly 82, each having their associated belt-driven mechanisms 88, discussed in connection with FIG. 6. It should be noted that in different embodiments, perpendicular shifter assemblies, e.g., such as the shifter assemblies 80, 82 shown in FIG. 7, may include different numbers of belt-driven mechanisms, e.g., such as the belt-driven mechanisms 88, to facilitate shifting of objects along corresponding axes of operation, e.g., at spaced intervals. In other words, a shifting mechanism may be configured so that a desired number of pathways for shifting along one axis are provided and a desired number of pathways for shifting along another perpendicular axis are provided (e.g., a 2×2, 2×4, 2×8, 4×4, 4×8 or another configuration of orthogonally oriented mechanisms is contemplated herein).

The shifting structures 76 shown in FIG. 7A each include an engaging mechanism 92. The engaging mechanism 92 allows a storage structure 44 to be securely coupled to the shifting structure 76. To enable this, the engaging mechanism 92 includes a plurality of adjustable, e.g., depressible, retractable, or actuatable, elements 94. The plurality of elements 94 extend along opposite sides of each shifting structure 76. In one embodiment, in a resting state, the plurality of elements 94 naturally bias outward. This bias may be provided using springs, magnets, and/or other mechanical, electrical, hydraulic, and/or pneumatic actuators integrated with the engaging mechanism 92, in different embodiments. The engaging mechanisms 92 are designed to engage a corresponding feature located on a storage structure 44, as described below.

During a shifting operation, a storage structure, such as the storage structure 44 shown in FIGS. 3-5, can be coupled to, and shifted on, the shifting structure 76, shown in isolation in FIG. 7B. In one embodiment, each storage structure 44 may include a base 37 with a plurality of apertures 35 extending along opposite sides of the base 37, as shown in FIG. 7B. The shifting structures 76, one of which is also shown in isolation in FIG. 7B, each include the engaging mechanism 92, which has the plurality of elements 94 located along opposite sides of the engaging mechanism 92, their position corresponding to the location of the plurality of apertures 35 formed in the base 37. With this corresponding configuration, the shifting structure 76 is able to receive, engage, and support the base 37, and by association, the support structure 44 coupled thereto, during a loading and shifting process, an example of which is described below.

The following illustrates an example process of loading, engaging, and shifting the example storage structure 44. First, the storage structure 44 is positioned for engagement with the shifting structure 76, e.g., using the loading mechanism 42. In one instance, the loading mechanism 42 advances the storage structure 44 onto the engaging mechanism 92, e.g., by shifting the track 50 shown in FIG. 3 toward the engaging mechanism 92. This interaction actuates, e.g., depresses, the plurality of elements 94 on the engaging mechanism 92 (the plurality of elements 94 may alternatively be retracted through operation of components internal to the engaging mechanism 92). Then, once the storage structure 44 is positioned so that a plurality of apertures (e.g., such as the apertures 35 shown in FIG. 7B) on a base (e.g., such as the base 37 shown in FIG. 7B) of the storage structure 44 are aligned with the plurality of elements 94 on the engaging mechanism 92, the plurality of elements 94 are extended, e.g., either through retracting the track 50 to de-engage it from the plurality of elements 94, or otherwise through actuating or de-actuating elements internal to the engaging mechanism 92. This results in the plurality of elements 94 extending outward, and into the plurality of apertures at the base of the storage structure 44. This engagement couples the shifting structure 76 and the storage structure 44 together, allowing the shifting structure 76 to translate about the track 74 in tandem with the storage structure 44.

Figure 8:
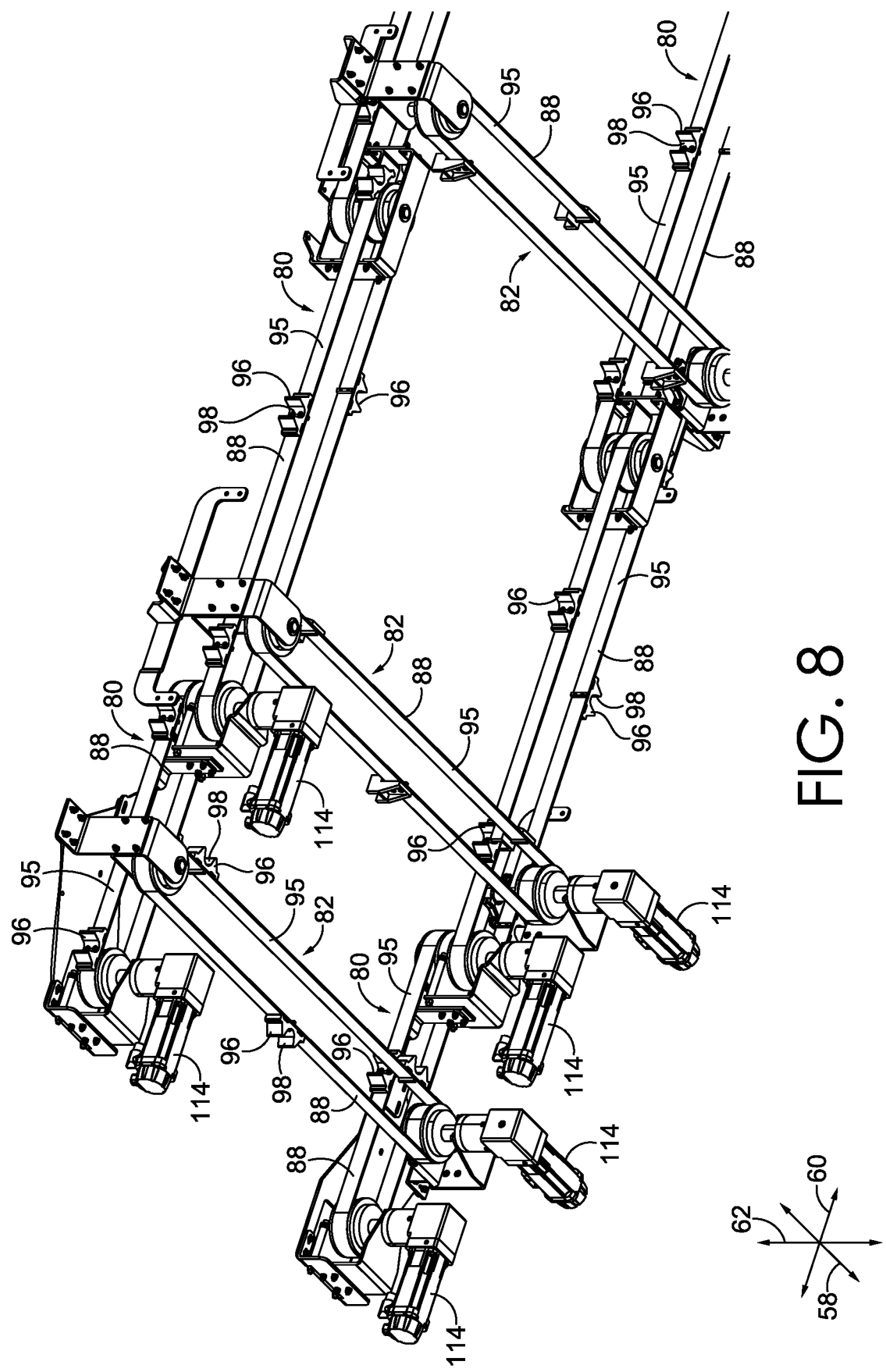
FIGS. 8-10 depict different parts of the shifting mechanism depicted in FIG. 6, in accordance with an embodiment hereof.
Figure 9:
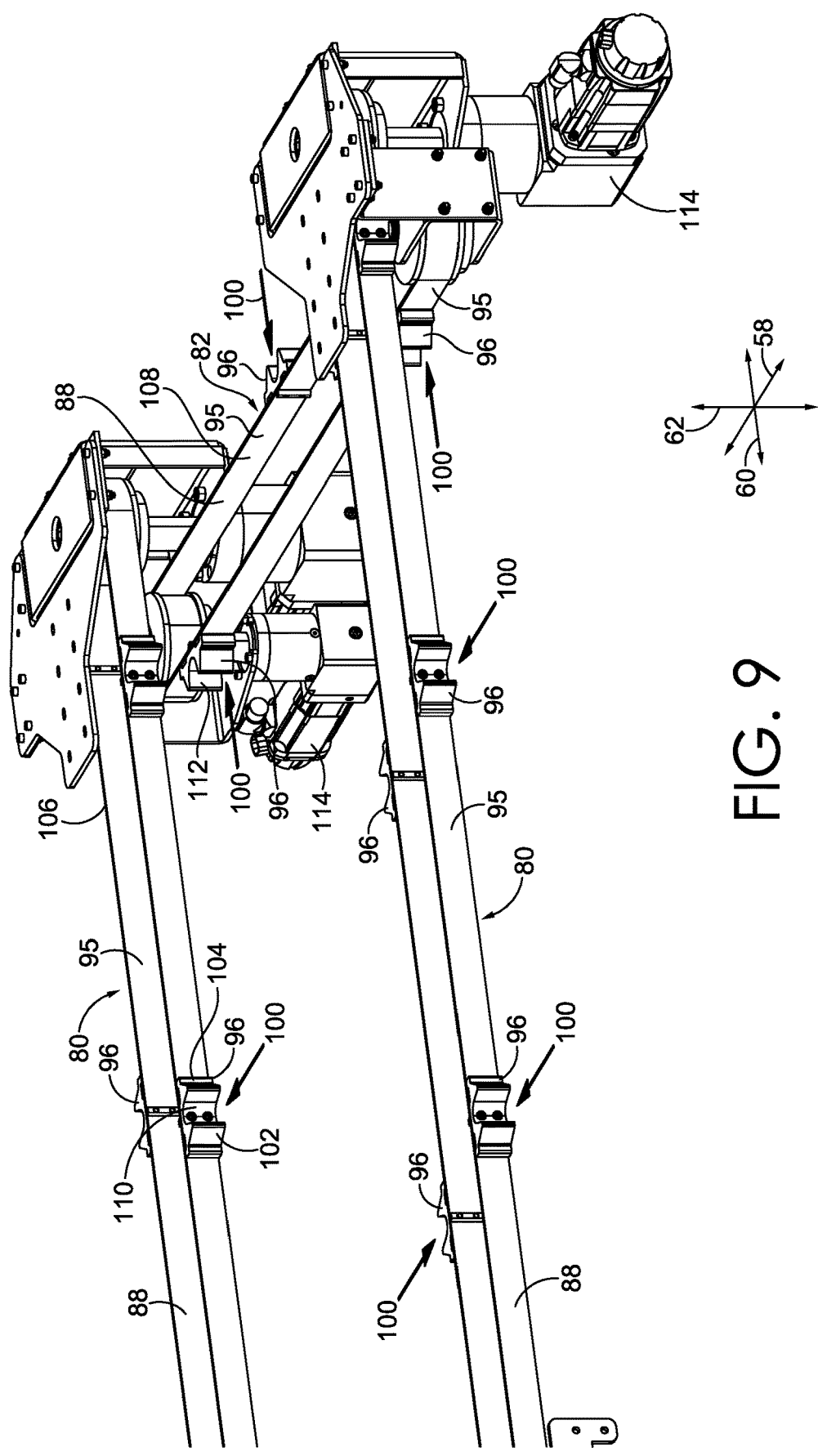
Figure 10:
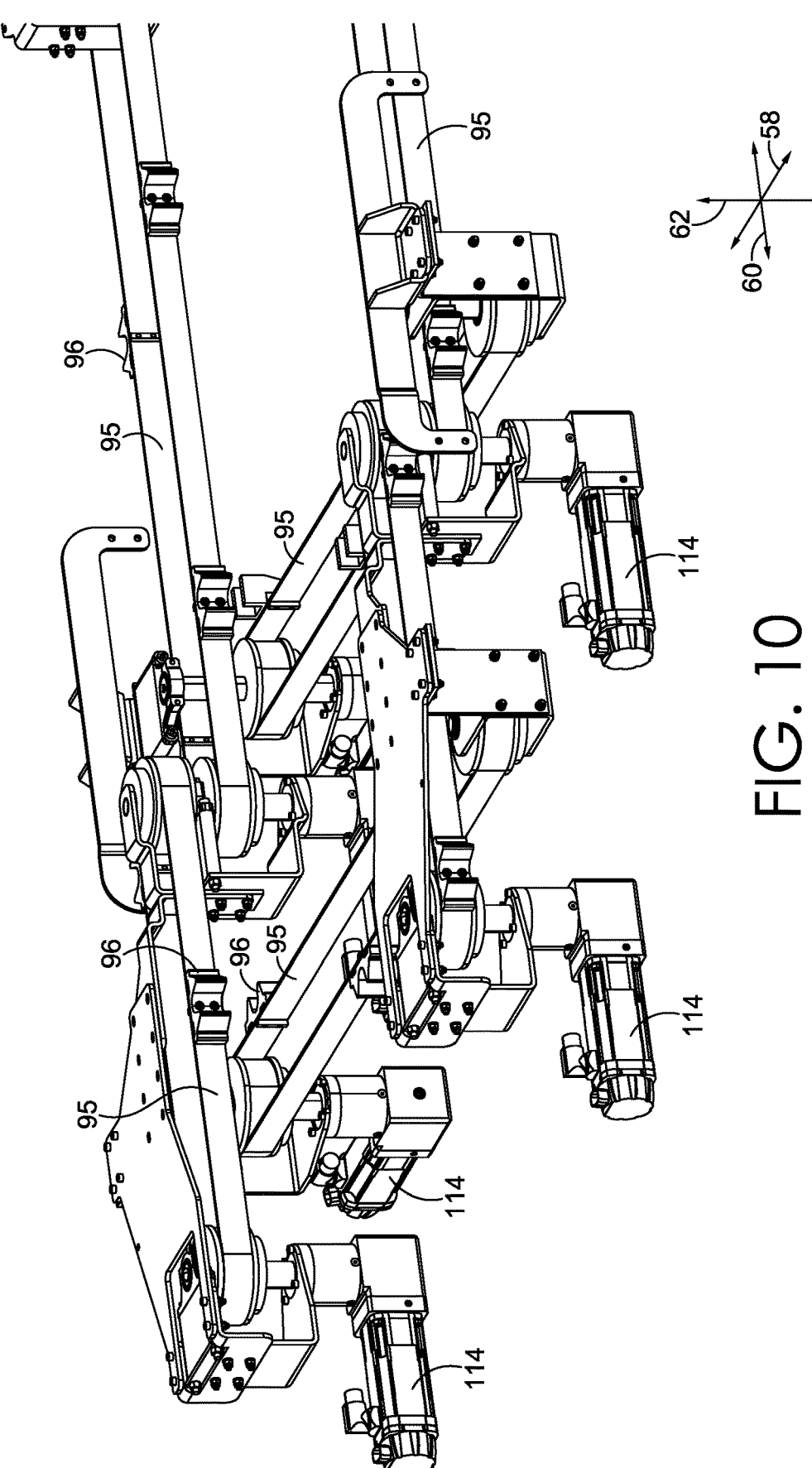

Looking at FIGS. 8-10, the belt-driven mechanisms 88 associated with the shifter assemblies 80, 82 are shown, in accordance with an embodiment hereof. FIGS. 8-10 depict different perspectives of the belt-driven mechanisms 88 associated with the shifting mechanism 46 shown in detail in FIG. 6.

Looking specifically at FIG. 8, it can be seen that the belt-driven mechanisms 88 each include a similar set of components that support operation thereof. For example, each belt-driven mechanism 88 includes a belt 95. In addition, each belt 95 includes a plurality of engaging elements 96 attached to the belt 95. The plurality of engaging elements 96 each have an opening 98 that is oriented perpendicular to the general direction of translation of the belt 95. Due to this configuration, an object, e.g., the elongated extension 90 of the shifting structure 76 shown in FIG. 6, is able to be received in the opening 98 of the engaging element 96, in a direction perpendicular to the general direction of translation of the belt 95. This direction along which the object, e.g., elongated extension 90 shown in FIG. 6, can enter/exit the opening 98 is shown by the arrows 100 provided in FIG. 9.

Looking specifically at FIG. 9, once an object, e.g., the elongated extension 90 shown in FIG. 6, is received in the plurality of engaging elements, sides 102, 104 of the engaging element 96 (only one pair of which are identified in FIG. 9 for explanation purposes) are able to translate a force from the belt 95 to the object, e.g., elongated extension 90, thereby shifting it in a general direction of translation of the belt 95. This causes the associated shifting structure 76 and any storage structure 44 supported thereon to be shifted along the general direction of translation of the belt 95. Depending on which belt-driven mechanism 88 is performing the shifting, the translation occurs along the axis 60, or the axis 58, as identified in FIGS. 8-10.

Looking specifically at FIGS. 9 and 10, it can be seen how the belt-driven mechanisms 88, and specifically those oriented perpendicular to each other, are positioned at different heights along the axis 62. This configuration allows an object, e.g., the elongated extension 90, to be translated along one axis 60 using an engaging element 110 of one belt-driven mechanism 106, and then be transferred into a perpendicularly oriented engaging element 112 located on another belt-driven mechanism 108 that is oriented perpendicular to the belt-driven mechanism 106. The object can then be shifted by the engaging element 112 along the axis 58, out of the engaging element 110, and along a new direction. The reverse is also possible, depending on the direction of rotation of the belts 95. This transfer, or "handoff" process for the object, e.g., the elongated extension 90 shown in FIG. 6, allows for continuous shifting of the storage structures throughout the staging area 72, both along the axis 58 and the axis 60. FIGS. 8-10 further depict a series of actuators 114 coupled to the belt-driven mechanisms 88 that translate the associated belts 95 during operation of the shifting mechanism 46.

Figure 11:
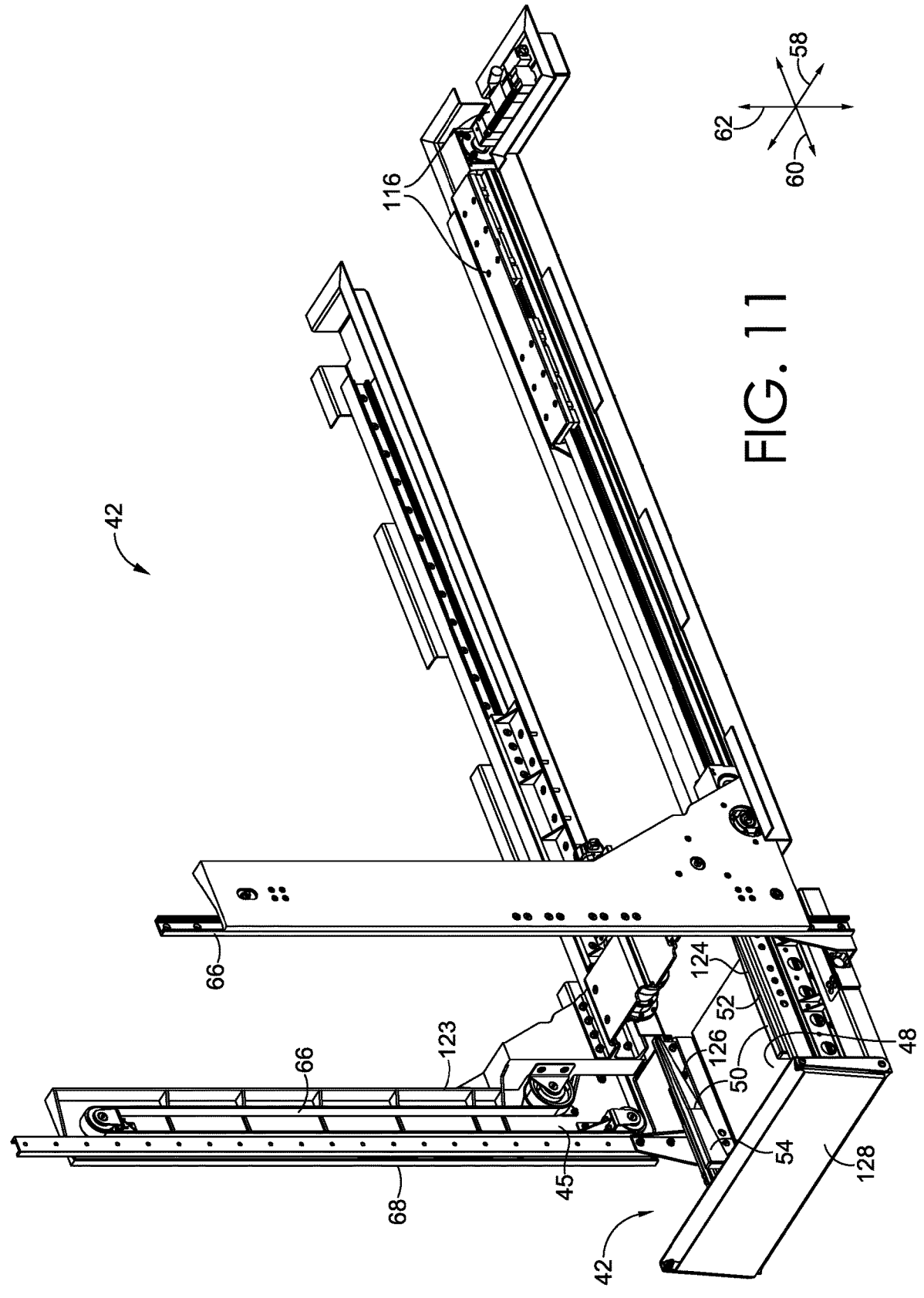
FIGS. 11-13 depict an example loading mechanism, in accordance with an embodiment hereof.
Figure 12:
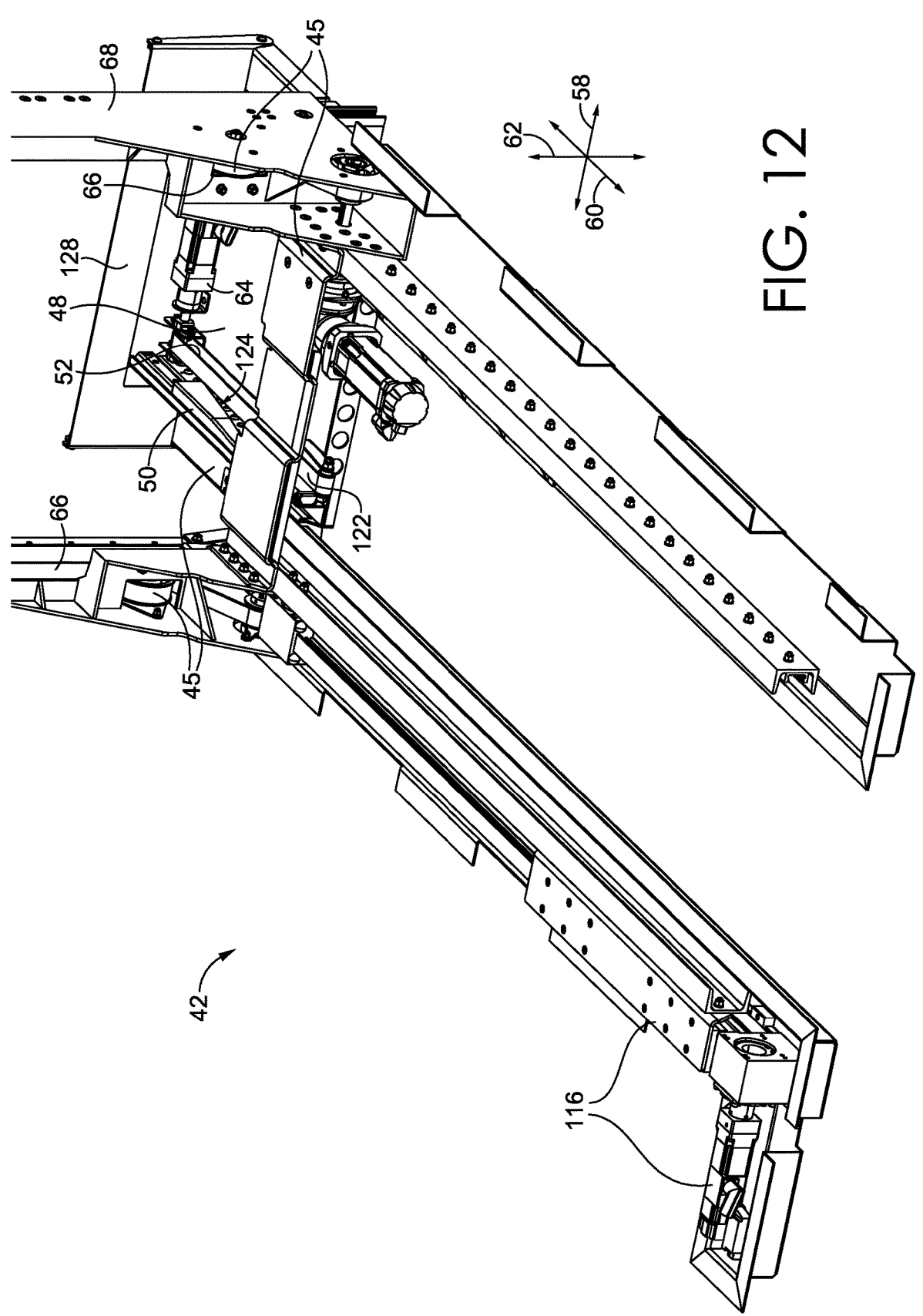
Figure 13:
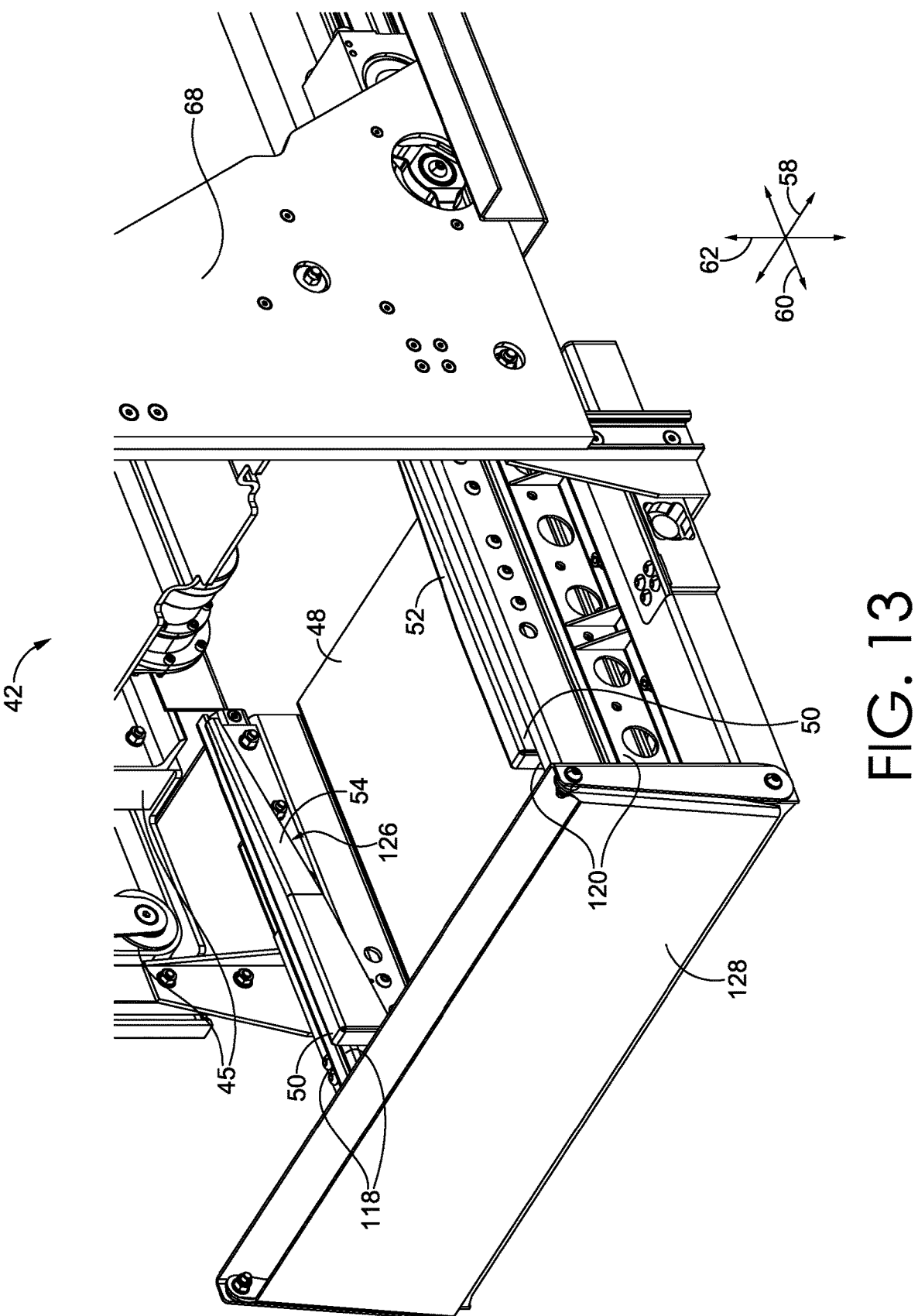

Looking at FIGS. 11-13, the loading mechanism 42 depicted originally in FIG. 3 is shown in isolation, in accordance with an embodiment hereof. FIG. 11 depicts a perspective view of the loading mechanism 42. FIG. 12 depicts an enhanced view of part of the loading mechanism 42. FIG. 13 depicts the platform 48 of the loading mechanism 42. The loading mechanism 42 shown in FIGS. 11-13 is intended to represent one example configuration, and numerous others capable of achieving the same functionality are contemplated herein.

The loading mechanism 42 shown in FIGS. 11-13 includes a storage structure 68, a platform 48, and a lift mechanism 45. The platform 48 includes a track 50 that includes a pair of elongated track elements 52, 54 that are spaced apart on the platform 48. The track elements 52, 54 are translatable along the axis 60, i.e., generally toward and away from the storage structure 68, through operation of the actuator assembly 64, shown in FIG. 12. The lift mechanism 45 includes an actuator assembly 66 that is operable to translate the platform 48 along the axis 62, i.e., between a lowered position and a raised position. The storage structure 68 extends generally along the axis 62. The loading mechanism 42 also includes a shifter assembly 116 that is operable to shift components along the axis 60, thereby allowing an object, e.g., the storage structure 44 shown in FIGS. 3-5, to be shifted from the track 50 into a staging area, e.g., where a shifting mechanism, such as the shifting mechanism 46 shown in FIGS. 3-5, is located.

Looking still at FIGS. 11-13, the lift mechanism 45 is designed so that a storage structure, e.g., the storage structure 44 shown in FIGS. 3-5, can initially be loaded onto the platform 48 where it is supported by the track 50 and track elements 52, 54 thereof. The actuator assembly 66 may then be operated to translate the platform 48, including the track 50, along the axis 62, i.e., from a lowered position to a raised position. The raised position, generally speaking, may be one that aligns the track 50 and track elements 52, 54 thereof with the shifter assembly 116 shown in FIG. 11. The actuator assembly 64 can then be operated to shift the track 50, e.g., with the storage structure 44 supported thereon, along the axis 60, i.e., shifting it towards the shifter assembly 116 shown in FIG. 12. The shifter assembly 116 may then be operated to further shift the storage structure into a staging area, e.g., the staging area 72 with the shifting mechanism 46 shown in FIGS. 3-5. In different aspects, the shifter assembly 116 may directly engage, and/or operate in coordination with, the track 50 and/or the track elements 52, 54.

Looking at FIG. 13, it is shown how the track elements 52, 54 extend across the platform 48. In addition, the track elements 52, 54 are spaced apart on the platform 48, allowing them to support the base of a storage structure, e.g., the storage structure 44 shown in FIGS. 3-5. The track elements 52, 54 are each coupled to a corresponding guide track 118, 120 that is fixed to the platform 48. During operation of the actuator assembly 64, the track elements 52, 54 can shift along their corresponding guide track 118, 120, i.e., back and forth along the axis 60. For example, when the track 50 is in alignment with the shifter assembly 116, this actuation allows a storage structure supported on the track elements 52, 54 to be shifted toward, e.g., into engagement with, the shifter assembly. The track elements 52, 54 also each include a corresponding surface 124, 126 that is angled, or slanted, relative to the axis 60 along which the track elements 52, 54 slide. These angled/slanted surfaces 124, 126 allow the track elements 52, 54 to progressively engage components located on a shifting structure, e.g., such as the engaging elements 94 located on the engaging mechanism 92 forming part of the shifting structure 76 shown in FIG. 7A. The platform 48 of the loading mechanism 42 also includes a door 128. The door 128 is pivotably coupled at an end of the platform 48. The door 128 is pivotal between a position that is generally parallel with the axis 62 and a position that is generally parallel with the axis 60. The door 128 can be used to secure/enclose structures positioned on the platform 48 during operation of the lift mechanism 45.

Looking still at the loading mechanism 42 shown in FIGS. 11-13, it can be seen how the actuator assembly 64 and the actuator assembly 66 each include different components that support their operation. For example, this may include belt-driven mechanisms, linear actuators, power components, and/or control components, among other possible components. In the embodiment shown in FIGS. 11-13, the actuator assemblies 64, 66 each include a corresponding belt-driven mechanism 122, 123 that is used to translate components. The belt-driven mechanisms 122, 123 each include a belt, at least two rollers over which the belt is positioned, and at least one rotational actuator that rotates the belt during operation of the belt-driven mechanisms 122, 123.

In different embodiments, the operation of the actuator assemblies 64, 66 and the shifter assembly 116 shown in FIGS. 11-13 may be directed by a control system. The control system may be connected to each of the assemblies 64, 66, 116, and may be local to the loading mechanism 42 and/or an associated mobile transport, and/or remote from the loading mechanism 42 and/or an associated mobile transport. The assemblies 64, 66, 116 may operate in automated or at least partially automated fashion, e.g., at the direction of the aforementioned control system. In one instance, the operations may be directed by a remote computing device that monitors and controls multiple components, e.g., the shifting mechanism 46 and door assembly 70.

Figure 14:
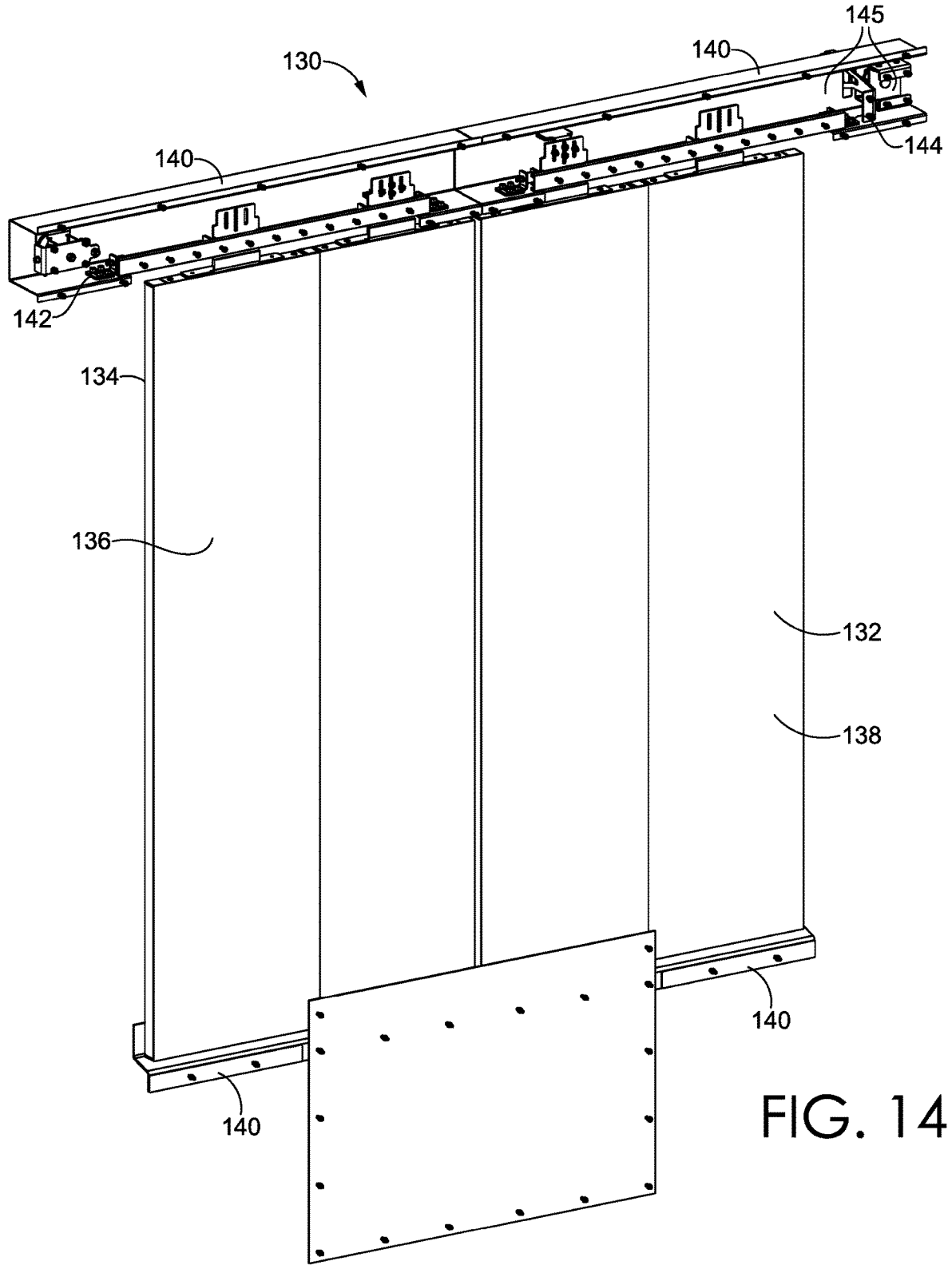
FIGS. 14-18 depict different parts of a door assembly, in accordance with embodiments hereof.
Figure 15:
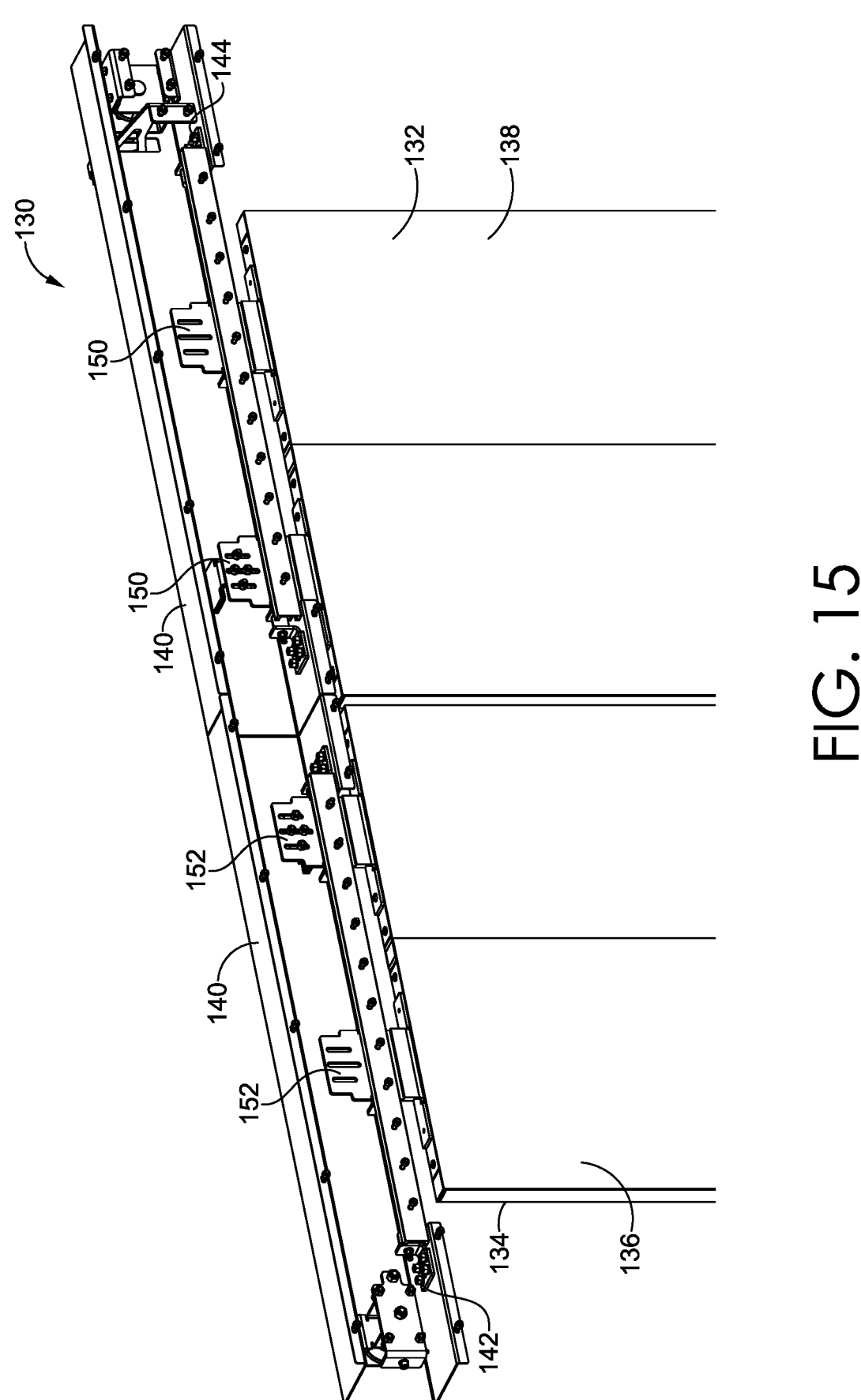
Figure 16:
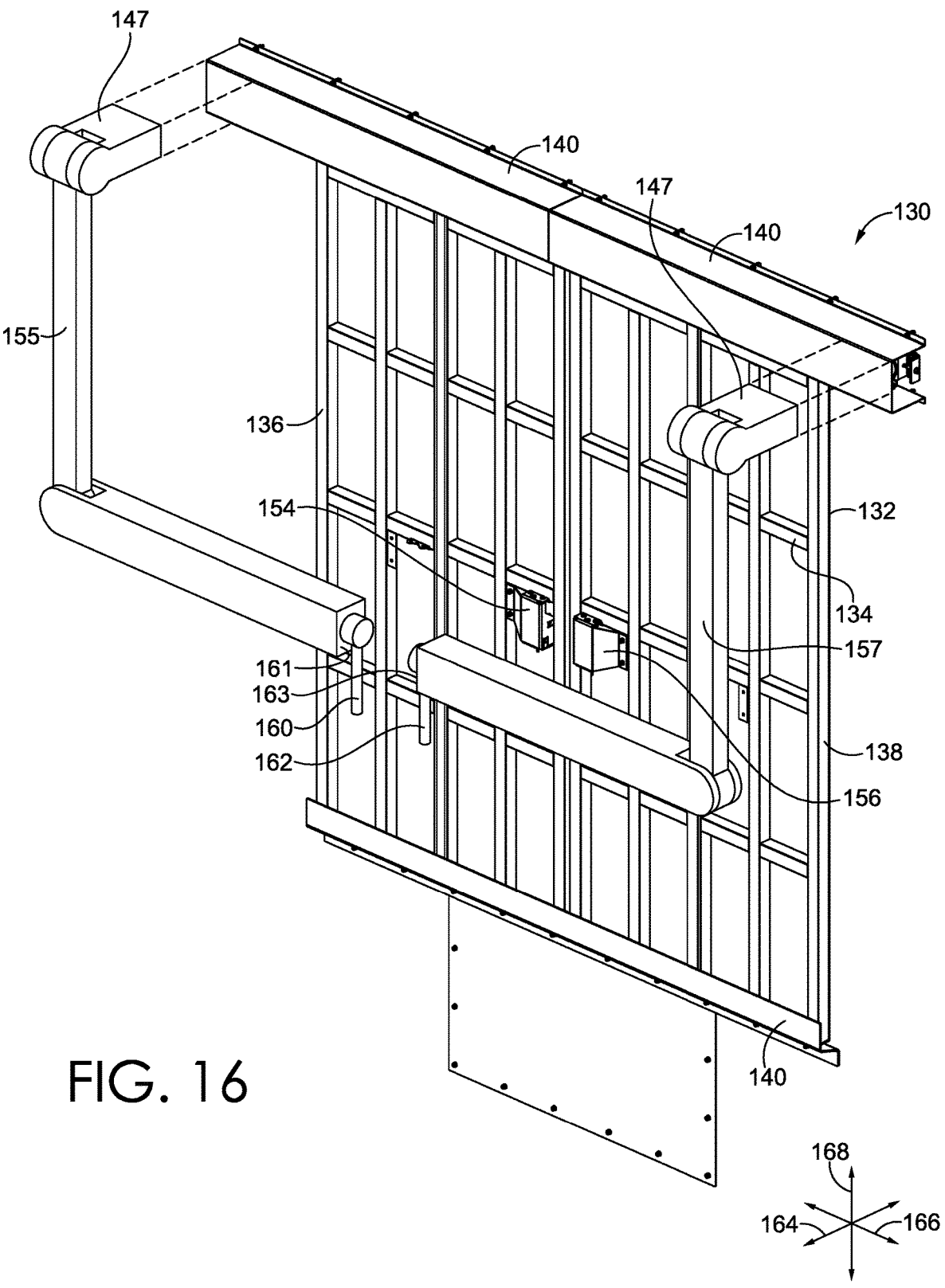
Figure 17:
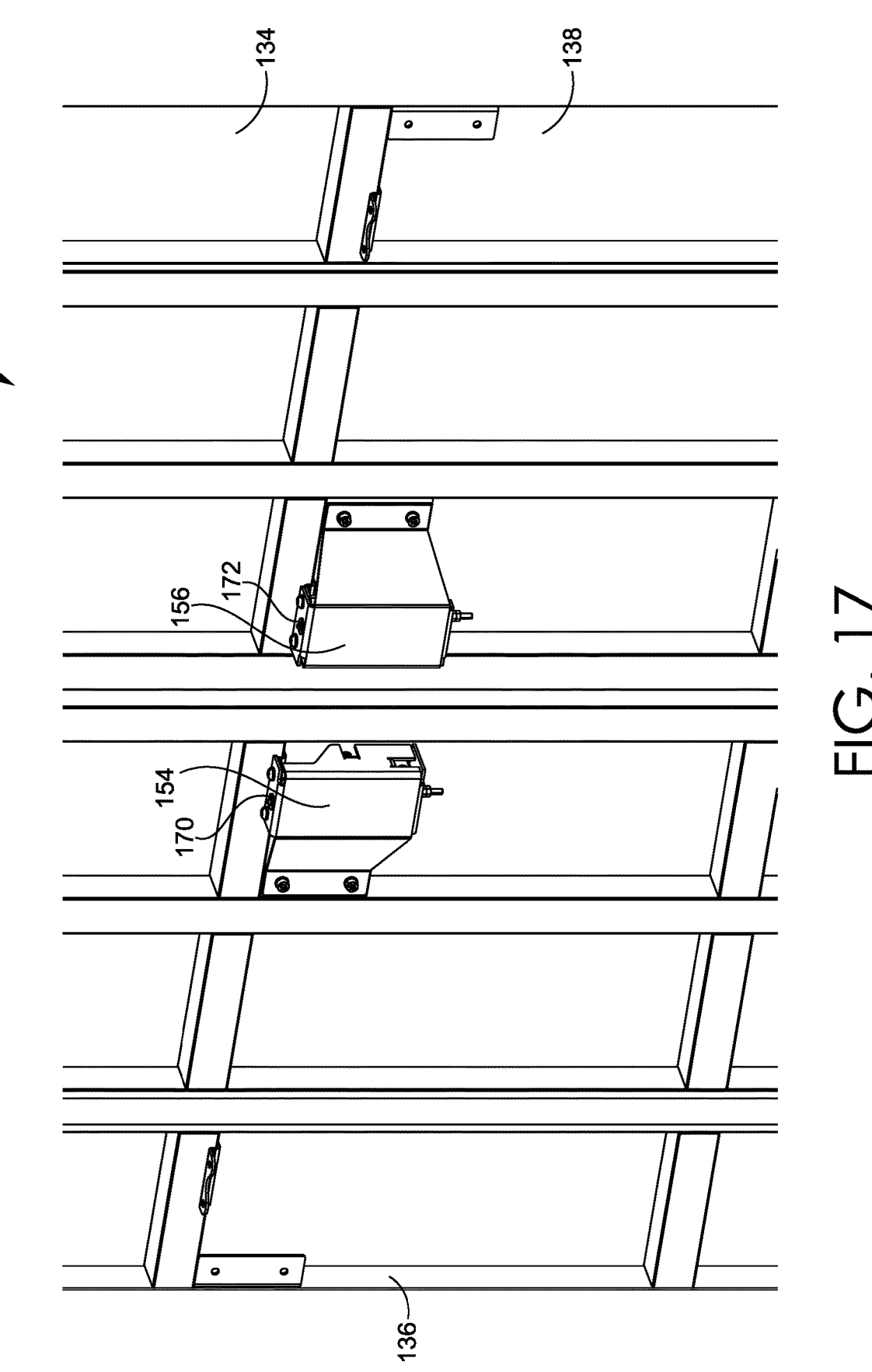
Figure 18:
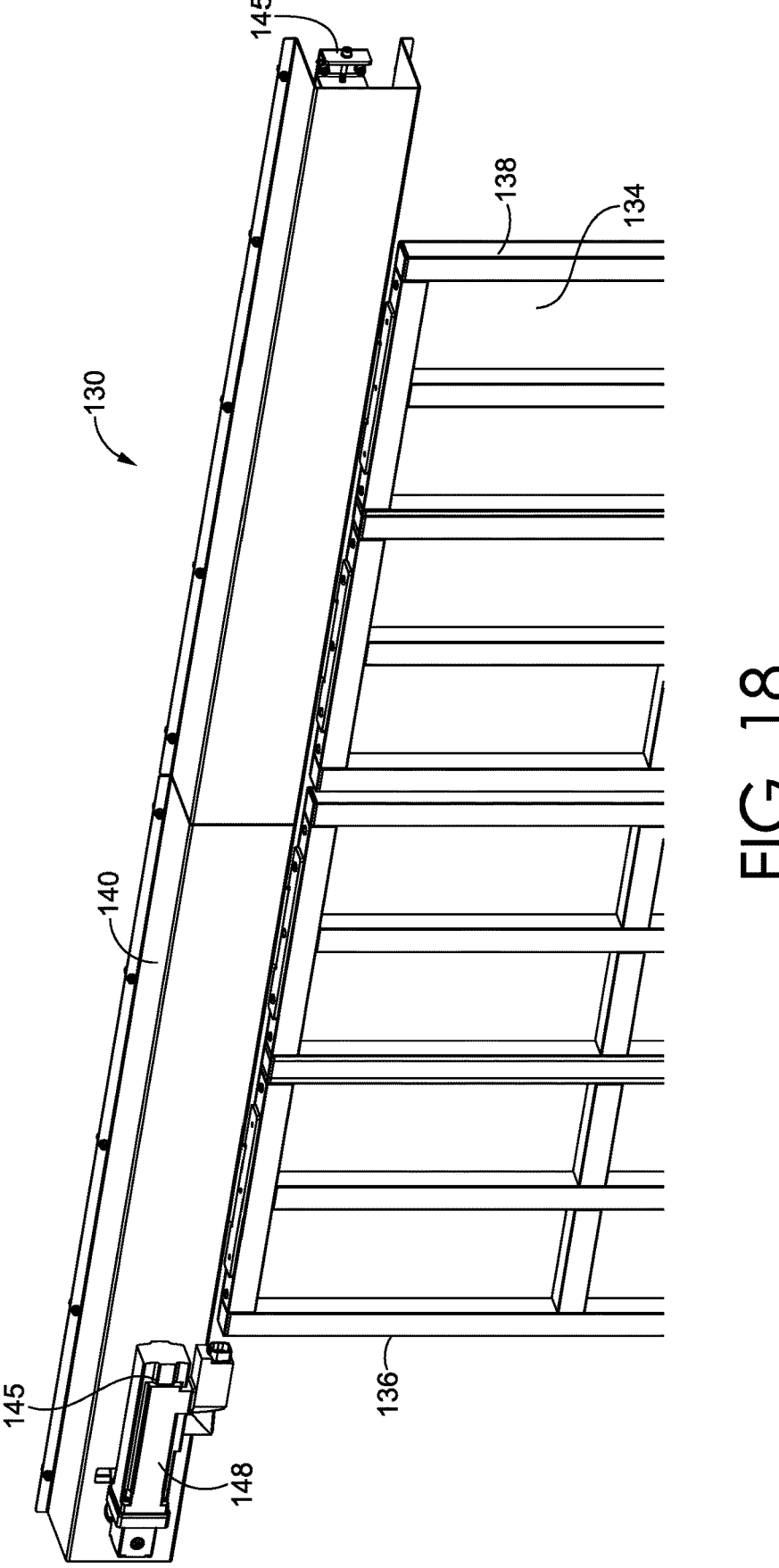

Looking at FIGS. 14-18, a door assembly 130 is provided, in accordance with an embodiment hereof. The door assembly 130 shown in FIGS. 14-18 is intended to represent one example configuration, with numerous others being contemplated herein. FIG. 14 depicts one side 132 of the door assembly 130. FIG. 15 is an enhanced depiction of part of the door assembly 130 shown in FIG. 14. FIG. 16 depicts another side 134 of the door assembly 130. FIG. 17 depicts part of the door assembly 130 shown in FIG. 16. FIG. 18 is another enhanced depiction of the door assembly 130 shown in FIG. 16. In one embodiment, the door assembly 130 may be integrated into a mobile transport, such as the vehicle 174 shown in FIG. 19. This integration may be provided through integral assembly/design, or through retrofitting an existing door assembly located in a vehicle.

Looking at FIG. 14, the door assembly 130, and in particular, the side 134 of the door assembly 130, is shown, in accordance with an embodiment hereof. The door assembly 130 includes a frame 140. The door assembly 130 also includes a pair of doors 136, 138 that are slidably coupled to respective tracks 142, 144 that extend along a top of the frame 140. The door assembly 130 further includes a door-shifting mechanism, variations of which are shown in FIGS. 16 and 18. In one embodiment, the door-shifting mechanism is an actuator 148, as shown in FIG. 18, that operates to shift the doors 136, 138 open and closed, e.g., at the direction of a control system. In another embodiment, the door-shifting mechanism includes movable components, e.g., as shown in FIG. 16, that operate to engage and translate the doors 136, 138 between a closed configuration and an open configuration, e.g., at the direction of a control system.

The door assembly 130 may be configured to operate in automated or semi-automated fashion. For example, a control system may be communicatively connected to components of the door assembly 130. In addition to controlling the door assembly 130, the control system may direct other loading, shifting, and/or staging components, e.g., allowing these systems to operate in coordination. This automated or semi-automated operation may impart greater efficiency to a loading, staging, and delivery sequence, e.g., one performed in a logistics network operation. In one instance, the door assembly 130 may be integrated into a delivery vehicle. Then, while the delivery vehicle travels a delivery route, a control system directs a shifting mechanism, such as the shifting mechanism 46 shown in FIGS. 3-5, to operate and re-organize a plurality of storage structures, e.g., the storage structures 44 shown in FIGS. 3-5, positioning a particular storage structure at the door assembly 130. The particular storage structure may be staged based on the vehicle approaching or arriving at a delivery destination associated with one or more objects stored on the storage structure. Upon arrival, the door assembly 130 may open in automated or semi-automated fashion to provide efficient access to the staged storage structure. This process may be repeated as the vehicle makes multiple delivery stops and thereby increase the speed and efficiency of a delivery operation.

Looking at FIG. 15, part of the door assembly 130 is shown, in accordance with an embodiment hereof. FIG. 15 shows the doors 136, 138 coupled to the frame 140 at the tracks 142, 144. The tracks 142, 144 may each include an elongated slot (not shown in FIG. 15) through which guides 150, 152 are respectively extended, and supported, allowing the doors 136, 138 to slide back and forth, e.g., in response to operation of a door-shifting mechanism.

Looking at FIG. 16, the side 134 of the door assembly 130 is shown, in accordance with an embodiment hereof. In one embodiment, the door assembly 130 may be integrated into a vehicle, where the side 134 is oriented to face a storage area in the vehicle, and the side 132 is oriented to face a cab in the vehicle. In a further embodiment, the storage area may include a shifting mechanism, e.g., such as the shifting mechanism 46 shown in FIGS. 3-5, that stages storage structures at the door assembly 130. The embodiment depicted in FIG. 16 includes a door-shifting mechanism 147 that is configured to engage and operate the doors 136, 138, as discussed further below.

The door-shifting mechanism 147 encompasses a series of elements that are used to open and close the doors 136, 138, e.g., in automated or semi-automated fashion. The doors 136, 138 each include a respective engaging element 154, 156, as shown in most detail in FIG. 17. The door-shifting mechanism 147 also includes engaging elements 160, 162 that are coupled to respective distal ends 161, 163 of movable members, e.g., multi-axis arms, 155, 157. The movable members 155, 157 are connected to one or more actuators and control components, and may include hinges, linearly-translating elements, and pivot or ball joints, among other features.

Through operation of the door-shifting mechanism 147, the engaging elements 160, 162 can be shifted in different directions, e.g., along the axis 164, 166, and/or 168, depending on the configuration. For example, in one embodiment, the engaging elements 160, 162 may be shiftable along the axis 166 and the axis 168, allowing them to translate into a coupled configuration with the engaging elements 154, 156. The engaging elements 160, 162 can be shifted into contact with the engaging elements 154, 156 through translation along the axis 168, and then the coupled engaging elements 154, 160 and 156, 162 can be shifted along the axis 166, thereby translating the doors 136, 138 between an open configuration and a closed configuration, depending on the direction of actuation. The engaging elements 154, 156, 160, 162 may be male-female couplings, magnetic mechanisms, latching mechanisms, or another form of mechanical, electrical, and/or pneumatic attachment mechanism. In additional embodiments, the engaging elements 160, 162 may simply remain fixed to the engaging elements 154, 156, such that shifting them into contact is not necessary to translate the doors 136, 138.

Looking at FIG. 17, part of the door assembly 130, located on the side 134, is depicted, in accordance with an embodiment hereof. FIG. 17 more clearly depicts the engaging elements 154, 156 mounted on the adjacent doors 136, 138. In this example embodiment, the engaging elements 154, 156 each include a recess 170, 172 that is shaped to receive a corresponding extension located on the engaging elements 160, 162 shown in FIG. 16. In the example of the door assembly 130, the extensions are the engaging elements 160, 162 that are insertable into the recesses 170, 172 along the axis 168, thus allowing a force applied by the engaging elements 160, 162 along the axis 166 to shift the engaging elements 154, 156, and by association, the doors 136, 138.

Looking at FIG. 18, the door assembly 130 is again shown, but with an actuator 148 that forms part of a door-shifting mechanism 145, in accordance with an embodiment hereof. In some embodiments, this configuration may be used for translating the doors 136, 138 along the tracks 142, 144 shown in FIG. 15, e.g., between a closed configuration and an open configuration. In one example, the actuator 148 may form part of a belt-driven assembly coupled to the frame 140 and to the doors 136, 138. In addition, or in the alternative, the movable members 155, 157 of the door-shifting mechanism 147 may be installed as shown in FIG. 16, and controlled/actuated to engage, open, close, and/or disengage the doors. In either instance, the door-shifting mechanisms 145, 147 may operate in automated or semi-automated fashion, e.g., at the direction of a control system.

Figure 19:
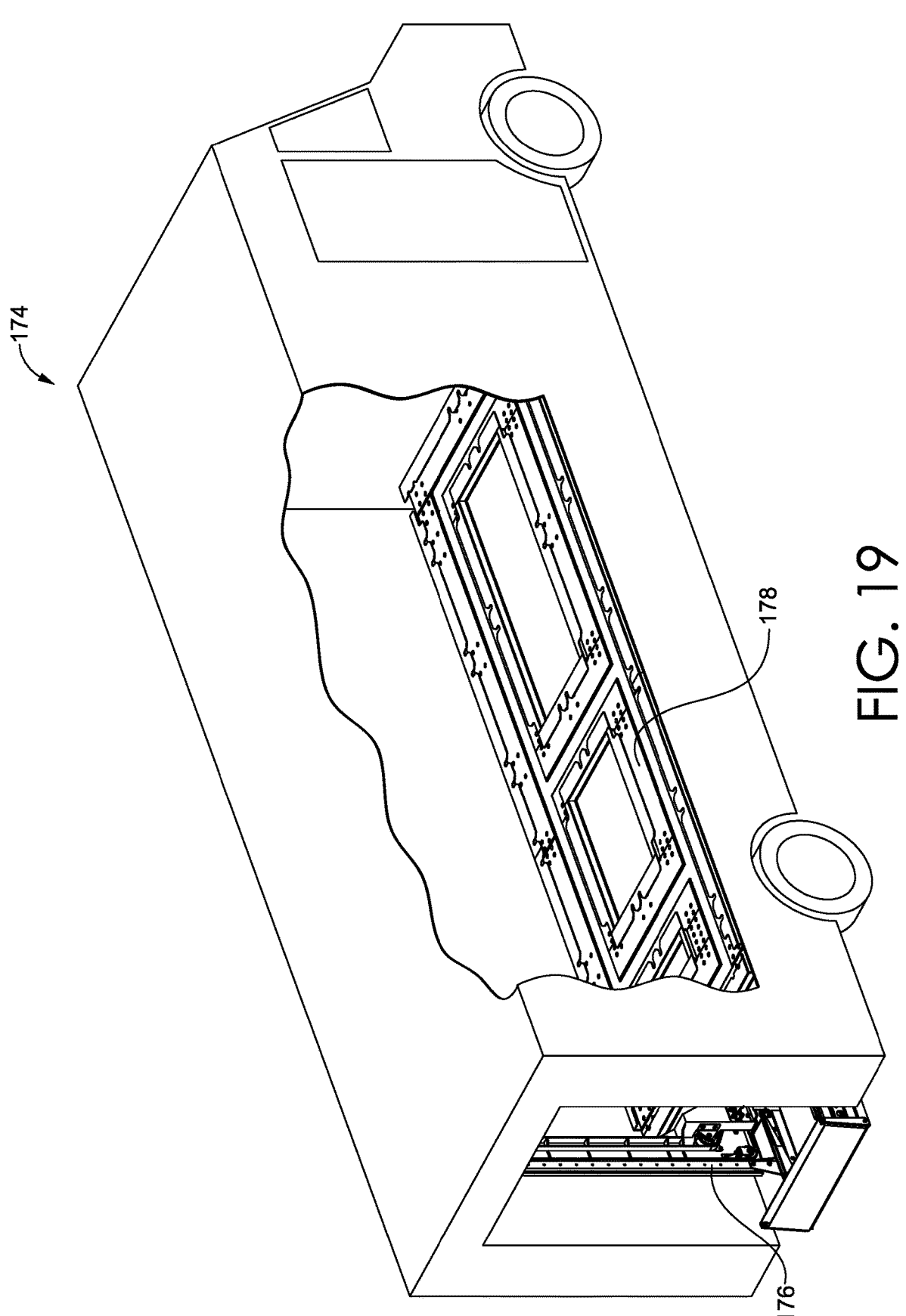
FIG. 19 depicts a vehicle with a shifting mechanism and a loading mechanism integrated therein, in accordance with an embodiment hereof.

Looking at FIG. 19, a vehicle 174 with a loading mechanism 176 and a shifting mechanism 178 (shown only in part for clarity) integrated therein is provided, in accordance with an embodiment hereof. While not shown, the vehicle 174 may also include a door assembly, e.g. the door assembly 130 shown in FIGS. 14-18, that may operate in automated or semi-automated fashion, e.g., in coordination with the loading mechanism 176 and the shifting mechanism 178, as described herein. The vehicle 174 and the systems integrated therein may be manually operated, autonomously operated (e.g., being driverless), and/or may be semi-autonomously operated. In one aspect, the vehicle 174 may be retrofitted from its original configuration to include the loading mechanism 176, the shifting mechanism 178, and the door assembly 130, e.g., to upgrade its automation capability for use in a logistics network operation.

Looking at FIG. 20, a block diagram of a method 2000 of loading a storage structure into a vehicle is provided, in accordance with an embodiment hereof. The method 2000 includes blocks 2010-2040, but is not limited to this combination of elements, or the order depicted. In block 2010, the method includes positioning a storage structure, such as the storage structure 44 shown in FIG. 3, adjacent to a loading mechanism, such as the loading mechanism 42 shown in FIG. 3, coupled to a vehicle, such as the vehicle 174 shown in FIG. 19. The loading mechanism may comprise a storage structure, such as the storage structure 68 shown in FIG. 11, a lift mechanism, such as the lift mechanism 45 shown in FIG. 11, coupled to the storage structure that includes a platform, such as the platform 48 shown in FIG. 11, with a track, such as the track 50 shown in FIG. 11, extending along the platform, a first actuator assembly, such as the actuator assembly 64 shown in FIG. 11, coupled to the track and operable to shift the track along a first axis, such as the axis 60 shown in FIG. 11, and a second actuator assembly, such as the actuator assembly 66 shown in FIG. 11, coupled to the platform and operable to shift the platform along a second axis, such as the axis 62 shown in FIG. 11, that is perpendicular to the first axis. In block 2020, the method includes positioning the storage structure on the track. In block 2030, the method includes operating the second actuator assembly to shift the storage structure from a lowered position to a raised position by translating the platform along the second axis. In block 2040, the method includes operating the first actuator assembly to translate the track along the first axis thereby shifting the storage structure into engagement with a shifting mechanism, such as the shifting mechanism 46 shown in FIGS. 3-5, located in the vehicle.

Looking at FIG. 21, a block diagram of a method 2100 of shifting storage structures in a storage space is provided, in accordance with an embodiment hereof. The method 2100 includes blocks 2110 and 2120, but is not limited to this combination of elements, or the order depicted. In block 2110, the method includes coupling a plurality of storage structures, such as the storage structures 44 shown in FIG. 3, to a shifting mechanism, such as the shifting mechanism 46 shown in FIG. 3, located at least partially in a storage space, such as the staging area 72 shown in FIG. 6. The shifting mechanism may include a track, such as the track 74 shown in FIG. 6, and a plurality of shifting structures, such as the shifting structures 76 shown in FIG. 6. The plurality of shifting structures may be movable along the track and configured to storage structures, such as the storage structures 44 shown in FIG. 3, while doing so. The shifting mechanism may further include a first shifter assembly, such as the shifter assembly 80 shown in FIG. 8, operable to move the plurality of shifting structures along a first axis, such as the axis 60 shown in FIG. 6. The first shifter assembly may include a plurality of engaging elements, such as the plurality of engaging elements 96 shown in FIG. 8, each having a concavity oriented perpendicular to the first axis. The shifting mechanism may further include a second shifter assembly, such as the shifter assembly 82 shown in FIG. 8, operable to move the plurality of shifting structures along a second axis, such as the axis 58 shown in FIG. 6, that is perpendicular to the first axis. The second shifter assembly may include a plurality of engaging elements, such as the plurality of engaging elements 96 shown in FIG. 8, each having a concavity oriented perpendicular to the second axis. Further, during operation of the shifting mechanism, the plurality of shifting structures may transfer between the first shifter assembly and the second shifter assembly, e.g., through a transfer process as described in connection with FIGS. 8-10. In block 2120, the method includes shifting the plurality of storage structures to different locations in the storage space, e.g. for staging in a delivery process.

Looking at FIG. 22, a block diagram of a method 2200 of manufacturing a shifting mechanism, such as the shifting mechanism 46 shown in FIGS. 3-5, is provided, in accordance with an embodiment hereof. The method 2200 includes blocks 2210-2240, but is not limited to this combination of elements, or the order depicted. In block 2210, the method includes assembling a track, such as the track 74 shown in FIG. 6. In block 2220, the method includes movably coupling a plurality of shifting structures, such as the shifting structures 76 shown in FIG. 6, to the track. In block 2230, the method includes coupling a first shifter assembly, such as the shifter assembly 80 shown in FIG. 6, to the track. The first shifter assembly may include a plurality of engaging structures, such as the plurality of engaging elements 96 shown in FIG. 8, translatable along a first axis, such as the axis 60 shown in FIG. 6, each one of the first plurality of engaging structures having a concavity oriented perpendicular to the first axis. In block 2240, the method includes coupling a second shifter assembly, such as the shifter assembly 82 shown in FIG. 6, to the track. The second shifter assembly may comprise a plurality of engaging structures, such as the plurality of engaging elements 96 shown in FIG. 8, translatable along a second axis, such as the second axis 58, perpendicular to the first axis, each one of the second plurality of engaging structures, such as the plurality of engaging elements 96 shown in FIG. 8, having a concavity oriented perpendicular to the second axis.

Figure 23:
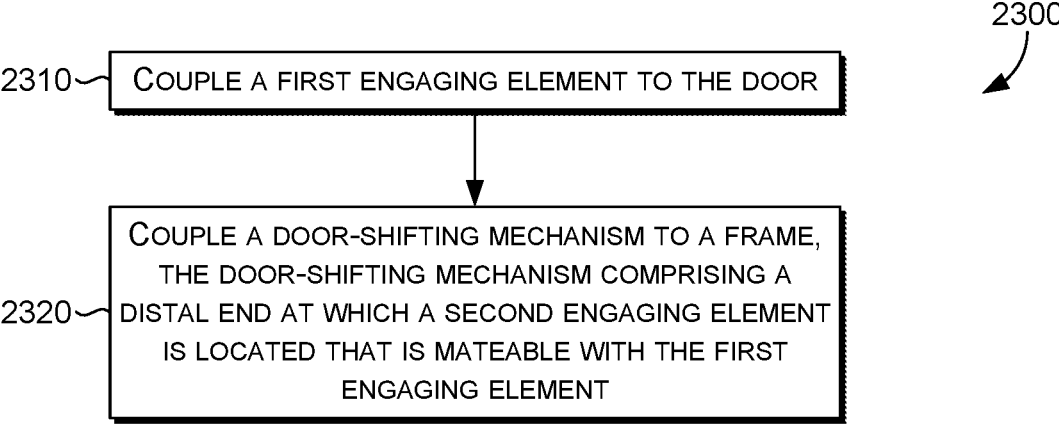
FIG. 23 depicts a block diagram of a method of operating an automated door assembly, in accordance with an embodiment hereof.

Looking at FIG. 23, a method 2300 of operating an automated door assembly, e.g., the door assembly 130 shown in FIG. 16, is provided, in accordance with an embodiment hereof. The automated door assembly may include a frame, such as the frame 140 shown in FIG. 16, a door, such as the door 136 or 138 shown in FIG. 16, slidably coupled to the frame, a door-shifting mechanism, such as the door-shifting mechanism 147 shown in FIG. 16, a first engaging element, such as the engaging element 154 or 156 shown in FIG. 16, coupled to the door, and a second engaging element, such as the engaging element 160 or 162 shown in FIG. 16, coupled to the door-shifting mechanism. The method includes blocks 2310-2320, but is not limited to this combination of elements, or the order depicted. In block 2310, the method includes operating the door-shifting mechanism to shift the second engaging element along a first axis, such as the axis 168 shown in FIG. 16, and into engagement with the first engaging element. In block 2320, the method includes operating the door-shifting mechanism to shift the coupled first engaging element and second engaging element along a second axis, such as the axis 166 shown in FIG. 16, that is perpendicular to the first axis to thereby translate the door between a closed configuration and an open configuration.

Figure 24:
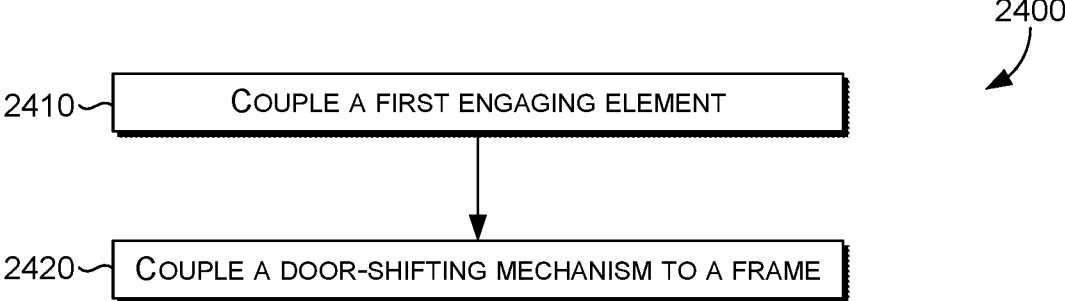
FIG. 24 depicts a block diagram of a method of retrofitting a door assembly located in a vehicle, in accordance with an embodiment hereof.

Looking at FIG. 24, a method 2400 of retrofitting a door assembly located in a vehicle, such as a delivery truck, is provided, in accordance with an embodiment hereof. The door assembly may include a frame, such as the frame 140 shown in FIG. 16, and a door, such as the door 136 or 138 shown in FIG. 16, that is slidably coupled to the frame. The method includes blocks 2410 and 2420, but is not limited to this combination of elements, or the order depicted. In block 2410, the method includes coupling a first engaging element, such as the engaging element 154 or 156 shown in FIG. 16, to the door. In block 2420, the method includes coupling a door-shifting mechanism, such as the door-shifting mechanism 147 shown in FIG. 16, to the frame, the door-shifting mechanism comprising a distal end, such as the distal end 161 or 163 shown in FIG. 16, at which a second engaging element, such as the engaging element 160 or 162 shown in FIG. 16, is located that is mateable with the first engaging element. In one aspect, the distal end is shiftable to different positions through operation of the door-shifting mechanism. In another aspect, the second engaging element is shiftable into a coupled configuration with the first engaging element. In another aspect, the second engaging element, when coupled with the first engaging element, is translatable to thereby shift the door between a closed configuration and an open configuration.

Embodiment 1. A loading mechanism for a vehicle comprising a storage structure; a lift mechanism coupled to the storage structure, the lift mechanism comprising a platform, a track extending along the platform, a first actuator assembly coupled to the track and operable to shift the track along a first axis, and a second actuator assembly coupled to the platform and operable to shift the platform along a second axis that is perpendicular to the first axis; and a control system connected to the first actuator assembly and to the second actuator assembly.

Embodiment 2. The loading mechanism of embodiment 1, wherein the loading mechanism is coupled to a storage compartment of a vehicle.

Embodiment 3. The loading mechanism of any of embodiments 1-2, wherein the track further comprises a pair of elongated track elements spaced apart on the platform, and wherein the pair of elongated track elements are translatable in coordination along the first axis through operation of the first actuator assembly.

Embodiment 4. The loading mechanism of any of embodiments 1-3, wherein each elongated track element is coupled to a corresponding guide track along which the elongated track element is translated by the first actuator assembly.

Embodiment 5. The loading mechanism of any of embodiments 1-4, wherein each elongated track element comprises a surface oriented at an angle to the first axis.

Embodiment 6. The loading mechanism of any of embodiments 1-5, wherein the first actuator assembly comprises a first belt-driven mechanism coupled to the track, and wherein the second actuator assembly comprises a second belt-driven driven mechanism coupled to the platform.

Embodiment 7. The loading mechanism of any of embodiments 1-6, wherein the lift mechanism further comprises a door pivotally coupled at one end of the platform, wherein the door is pivotal between a first position parallel with the first axis and a second position parallel with the second axis.

Embodiment 8. A method of loading a storage structure into a storage space of a vehicle, the method comprising positioning the storage structure adjacent to a loading mechanism coupled to the vehicle, the loading mechanism comprising a storage structure, and a lift mechanism coupled to the storage structure, the lift mechanism comprising a platform, a track extending along the platform, a first actuator assembly coupled to the track and operable to shift the track along a first axis, and a second actuator assembly coupled to the platform and operable to shift the platform along a second axis that is perpendicular to the first axis; positioning the storage structure on the track; operating the second actuator assembly to shift the storage structure from a lowered position to a raised position by translating the platform along the second axis; and operating the first actuator assembly to translate the track along the first axis thereby shifting the storage structure into engagement with a shifting mechanism located in the vehicle.

Embodiment 9. The method of embodiment 8, wherein the track further comprises a pair of elongated track elements spaced apart on the platform, and wherein the pair of elongated track elements are translated in coordination along the first axis through operation of the first actuator assembly.

Embodiment 10. The method of any of embodiments 8-9, wherein the storage structure comprises a base that engages the pair of elongated track elements.

Embodiment 11. The method of any of embodiments 8-10, wherein each elongated track element comprises a surface that is angled relative to the first axis.

Embodiment 12. The method of any of embodiments 8-11, wherein, as the storage structure positioned on the track is translated toward the shifting mechanism, the pair of elongated track elements depress an engaging mechanism located on a shifting structure that forms part of the shifting mechanism and that is aligned with the track.

Embodiment 13. The method of any of embodiments 8-12, wherein the engaging mechanism comprises a plurality of movable elements located on opposite sides of the shifting structure, and wherein the plurality of movable elements are alignable with, and extendable into, a corresponding plurality of apertures located on opposite sides of a base of the storage structure.

Embodiment 14. The method of any of embodiments 8-13, further comprising operating the first actuator assembly to translate the track along the first axis and away from the shifting structure to thereby lock the plurality of movable elements into the plurality of apertures.

Embodiment 15. The method of any of embodiments 8-14, wherein the pair of elongated track elements are triangular in shape, and wherein the plurality of movable elements are coupled to a biasing mechanism.

Embodiment 16. A loading system for a vehicle comprising a storage space; a shifting mechanism located at least partially in the storage space; and a loading mechanism configured to receive a storage structure, lift the storage structure, and translate the storage structure into a coupled configuration with the shifting mechanism.

Embodiment 17. The loading system of embodiment 16, herein the storage space comprises a storage compartment within the vehicle.

Embodiment 18. The loading system of any of embodiments 16-17, wherein the loading mechanism further comprises a platform; a track coupled to the platform; a first actuator assembly coupled to the track and operable to shift the track along a first axis; and a second actuator assembly coupled to the platform and operable to shift the platform along a second axis that is perpendicular to the first axis.

Embodiment 19. The loading system of any of embodiments 16-18, wherein the loading mechanism and the shifting mechanism are operable in coordination at the direction of a control system.

Embodiment 20. The loading system of any of embodiments 16-19, wherein the control system is integrated with the vehicle.

Embodiment 21. A shifting mechanism for a vehicle comprising a track; a plurality of shifting structures movable along the track; a first shifter assembly operable to move the plurality of shifting structures along a first axis, the first shifter assembly comprising a first plurality of engaging elements each having a concavity oriented perpendicular to the first axis; and a second shifter assembly operable to move the plurality of shifting structures along a second axis that is perpendicular to the first axis, the second shifter assembly comprising a second plurality of engaging elements each having a concavity oriented perpendicular to the second axis, wherein, during operation of the shifting mechanism, the plurality of shifting structures move between the first shifter assembly and the second shifter assembly.

Embodiment 22. The shifting mechanism of embodiment 21, wherein the shifting mechanism is integrated with a vehicle.

Embodiment 23. The shifting mechanism of any of embodiments 21-22, wherein the first shifter assembly comprises a first belt-driven mechanism and a second belt-driven mechanism that extend along the first axis in spaced apart relation, and wherein the second shifter assembly comprises a third belt-driven mechanism and a fourth belt-driven mechanism that extend along the second axis in spaced apart relation.

Embodiment 24. The shifting mechanism of any of embodiments 21-23, wherein the first plurality of engaging elements are located in part on the first belt-driven mechanism and in part on the second belt-driven mechanism, and wherein the second plurality of engaging elements are located in part on the third belt-driven mechanism and in part on the fourth belt-driven mechanism.

Embodiment 25. The shifting mechanism of any of embodiments 21-24, wherein each one of the first plurality of engaging elements and each one of the second plurality of engaging elements comprises a C-shaped structure.

Embodiment 26. The shifting mechanism of any of embodiments 21-25, wherein each one of the plurality of shifting structures comprises an elongated extension, and wherein the C-shaped structure is shaped to receive the elongated extension.

Embodiment 27. The shifting mechanism of any of embodiments 21-26, wherein each of the plurality of shifting structures includes an engaging mechanism having a plurality of movable elements.

Embodiment 28. The shifting mechanism of any of embodiments 21-27, further comprising a storage structure having a base with a plurality of apertures extending along opposite sides of the base, wherein the plurality of apertures are alignable with the plurality of movable elements located on each shifting structure.

Embodiment 29. The shifting mechanism of any of embodiments 21-28, further comprising a control system coupled to the first shifter assembly and the second shifter assembly.

Embodiment 30. A method of shifting storage structures in a storage space, the method comprising coupling a plurality of storage structures to a shifting mechanism located at least partially in the storage space, wherein the shifting mechanism comprises a track; a plurality of shifting structures movable along the track, wherein each storage structure is coupled to a corresponding one of the plurality of shifting structures; a first shifter assembly operable to move the plurality of shifting structures along a first axis, the first shifter assembly comprising a first plurality of engaging elements each having a concavity oriented perpendicular to the first axis; and a second shifter assembly operable to move the plurality of shifting structures along a second axis that is perpendicular to the first axis, the second shifter assembly comprising a second plurality of engaging elements each having a concavity oriented perpendicular to the second axis, wherein, during operation of the shifting mechanism, the plurality of shifting structures move between the first shifter assembly and the second shifter assembly; and shifting the plurality of storage structures to different locations in the storage space.

Embodiment 31. The method of embodiment 30, wherein the shifting mechanism is integrated with a vehicle.

Embodiment 32. The method of any of embodiments 30-31, further comprising moving one of the plurality of shifting structures and the storage structure supported thereon to a location in the storage space based on a location or route of the vehicle.

Embodiment 33. The method of any of embodiments 30-32, wherein the first shifter assembly comprises a first belt-driven mechanism and a second belt-driven mechanism extending along the first axis in spaced apart relation, and wherein the second shifter assembly comprises a third belt-driven mechanism and a fourth belt-driven mechanism extending along the second axis in spaced apart relation.

Embodiment 34. The method of any of embodiments 30-33, wherein the first plurality of engaging elements are located in part on the first belt-driven mechanism and in part on the second belt-driven mechanism, and wherein the second plurality of engaging elements are located in part on the third belt-driven mechanism and in part on the fourth belt-driven mechanism.

Embodiment 35. The method of any of embodiments 30-34, wherein each one of the first plurality of engaging elements and each one of the second plurality of engaging elements comprises a C-shaped structure, wherein each one of the plurality of shifting structures comprises an elongated extension, and wherein each C-shaped structure is shaped to receive the elongated extension.

Embodiment 36. A method of manufacturing a shifting mechanism, the method comprising assembling a track; movably coupling a plurality of shifting structures to the track; coupling a first shifter assembly to the track, the first shifter assembly comprising a first plurality of engaging elements translatable along a first axis, wherein each one of the first plurality of engaging elements has a concavity oriented perpendicular to the first axis; and coupling a second shifter assembly to the track, the second shifter assembly comprising a second plurality of engaging elements translatable along a second axis perpendicular to the first axis, wherein each one of the second plurality of engaging elements has a concavity oriented perpendicular to the second axis.

Embodiment 37. The method of embodiment 36, wherein the shifting mechanism is integrated into a vehicle.

Embodiment 38. The method of any of embodiments 36-37, wherein each one of the first plurality of engaging elements and each one of the second plurality of engaging elements comprise a C-shaped structure coupled to an associated drive-belt.

Embodiment 39. The method of any of embodiments 36-38, further comprising assembling a plurality of storage structures adapted to be coupled to the plurality of shifting structures.

Embodiment 40. The method of any of embodiments 36-39, further comprising coupling a control system to the first shifter assembly and to the second shifter assembly.

Embodiment 41. A door assembly for a vehicle, comprising a frame; a door slidably coupled to the frame, the door slidable between an open configuration and a closed configuration; a door-shifting mechanism coupled to the frame and having a distal end; a first engaging element coupled to the door; and a second engaging element coupled to the distal end, wherein the second engaging element is movable to different positions through operation of the door-shifting mechanism, wherein the second engaging element is shiftable into engagement with the first engaging element, and wherein the second engaging element, when engaged with the first engaging element, is translatable to thereby shift the door between the closed configuration and the open configuration.

Embodiment 42. The door assembly of embodiment 41, wherein the door is slidably coupled to a track extending along the frame.

Embodiment 43. The door assembly of any of embodiments 41-42, wherein the door-shifting mechanism further comprises a plurality of actuators operable to shift the distal end in a plurality of different directions; and a control system configured to direct operation of the plurality of actuators.

Embodiment 44. The door assembly of any of embodiments 41-43, wherein the control system is configured to direct operation of the door-shifting mechanism based on a location or route of the vehicle.

Embodiment 45. The door assembly of any of embodiments 41-44, wherein the door-shifting mechanism is configured to shift the distal end along a first axis and along a second axis, the first axis extending between a bottom end and a top end of the door, and the second axis extending between a first side and a second side of the door.

Embodiment 46. The door assembly of any of embodiments 41-45, wherein the door-shifting mechanism comprises a hinged arms and a linear actuator operable to translate the distal end along the first axis.

Embodiment 47. The door assembly of any of embodiments 41-46, wherein the first engaging element and the second engaging element form a mechanical coupling.

Embodiment 48. The door assembly of any of embodiments 41-47, wherein the mechanical coupling comprises a male-female mechanical coupling.

Embodiment 49. The door assembly of any of embodiments 41-48, wherein the mechanical coupling comprises a releasable latching mechanism.

Embodiment 50. The door assembly of any of embodiments 41-49, wherein the door and the door-shifting mechanism form one of a pair positioned on opposite sides of the frame.

Embodiment 51. A method of operating an automated door assembly located in a vehicle, the automated door assembly comprising a frame, a door slidably coupled to the frame, a door-shifting mechanism, a first engaging element coupled to the door, and a second engaging element coupled to the door-shifting mechanism, the method comprising operating the door-shifting mechanism to shift the second engaging element along a first axis and into engagement with the first engaging element; and operating the door-shifting mechanism to shift the coupled first engaging element and second engaging element along a second axis that is perpendicular to the first axis to thereby translate the door between a closed configuration and an open configuration.

Embodiment 52. The method of embodiment 51, further comprising coupling the first engaging element to the door; and coupling the door-shifting mechanism to the frame.

Embodiment 53. The method of any of embodiments 51-52, wherein the first engaging element and the second engaging element comprise a mechanical coupling.

Embodiment 54. The method of any of embodiments 51-53, wherein the second engaging element is coupled to a distal end of the door-shifting mechanism that is translatable in each of an x, y, and z direction.

Embodiment 55. The method of any of embodiments 51-54, wherein operation of the door-shifting mechanism is directed by a control system integrated with the vehicle.

Embodiment 56. The method of any of embodiments 51-55, wherein engaging the first engaging element and the second engaging element comprises aligning, through operation of the door-shifting mechanism, the first engaging element with the second engaging element and releasably coupling, through operation of the door-shifting mechanism, the first engaging element and the second engaging element.

Embodiment 57. The method of any of embodiments 51-56, wherein the door-shifting mechanism operates in response to a location or route of the vehicle.

Embodiment 58. A method of retrofitting a door assembly located in a vehicle, the door assembly comprising a frame and a door that is slidably coupled to the frame, the method comprising coupling a first engaging element to the door; coupling a door-shifting mechanism to the frame, the door-shifting mechanism comprising a distal end at which a second engaging element is located that is engageable with the first engaging element, wherein the distal end is shiftable to different positions through operation of the door-shifting mechanism, wherein the second engaging element is shiftable into a coupled configuration with the first engaging element, and wherein the second engaging element, when coupled with the first engaging element, is translatable to thereby shift the door between a closed configuration and an open configuration.

Embodiment 59. The method of embodiment 58, wherein the vehicle includes a cab and a storage space, and wherein the door assembly is located between the cab and the storage space.

Embodiment 60. The method of any of embodiments 58-59, wherein the distal end is coupled to a robot arm, and wherein the distal end is translatable in each of an x, y, and z direction.

Embodiment 61. Any of the preceding embodiments in any combination.

In some embodiments, this disclosure may include the language, for example, "at least one of [element A] and [element B]." This language may refer to one or more of the elements. For example, "at least one of A and B" may refer to "A," "B," or "A and B." In other words, "at least one of A and B" may refer to "at least one of A and at least one of B," or "at least either of A or B." In some embodiments, this disclosure may include the language, for example, "[element A], [element B], and/or [element C]." This language may refer to either of the elements or any combination thereof. In other words, "A, B, and/or C" may refer to "A," "B," "C," "A and B," "A and C," "B and C," or "A, B, and C." In addition, this disclosure may use the term "and/or" which may refer to any one or combination of the associated elements.

The subject matter of this disclosure has been described in relation to particular embodiments, which are intended in all respects to be illustrative rather than restrictive. Alternative embodiments will become apparent to those of ordinary skill in the art to which the present subject matter pertains without departing from the scope hereof. Different combinations and sub-combinations of elements, as well as use of elements not shown, are also possible and contemplated herein.

What is claimed is:

1. A lift mechanism comprising:
a platform;
track elements extending along the platform,
a first actuator assembly operable to shift the track elements in coordination along a first axis thereby shifting an object into engagement with a shifting mechanism; and
a second actuator assembly coupled to the platform and operable to shift the platform along a second axis that is substantially perpendicular to the first axis to shift the object from a lowered position to a raised position, wherein as the object positioned on the track elements translates towards the shifting mechanism, the track elements are configured to depress an engaging mechanism located on the shifting mechanism that is aligned with the track elements.

2. The lift mechanism of claim 1, wherein each track element of the track elements is coupled to a corresponding guide track along which the corresponding track element is translated by the first actuator assembly.

3. The lift mechanism of claim 1, wherein each track element of the track elements comprises a surface oriented at an angle to the first axis.

4. The lift mechanism of claim 1, wherein the first actuator assembly comprises a first belt-driven mechanism coupled to the track elements, and the second actuator assembly comprises a second belt-driven mechanism coupled to the platform.

5. The lift mechanism of claim 1, further comprising a door pivotally coupled at one end of the platform, wherein the door is pivotal between a first position parallel with the first axis and a second position parallel with the second axis.

6. The lift mechanism of claim 1, wherein the engaging mechanism comprises a plurality of movable elements located on opposite sides of the shifting mechanism, and each of the plurality of movable elements is alignable with, and extendable into, a corresponding aperture of a plurality of apertures located on opposite sides of the object.

7. The lift mechanism of claim 6, wherein the first actuator assembly is operable to translate the track elements along the first axis and away from the shifting mechanism to thereby lock the plurality of movable elements into the plurality of apertures.

8. The lift mechanism of claim 7, wherein each of the track elements is triangular, and the plurality of movable elements is coupled to a biasing mechanism.

9. The lift mechanism of claim 1, wherein the lift mechanism and the shifting mechanism are operable in coordination at a direction of a control system.

10. A method comprising:
positioning an object adjacent to a lift mechanism, wherein the lift mechanism comprises:
a platform,
track elements extending along the platform,
a first actuator assembly operable to shift the track elements in coordination along a first axis, and
a second actuator assembly operable to shift the platform along a second axis that is substantially perpendicular to the first axis;
positioning the object on the track elements to engage a base of the object with the track elements;

operating the second actuator assembly to shift the object from a lowered position to a raised position by translating the platform along the second axis; and
operating the first actuator assembly to translate the track elements along the first axis thereby shifting the object into engagement with a shifting mechanism, wherein as the object positioned on the track elements translates towards the shifting mechanism, the track elements depress an engaging mechanism located on the shifting mechanism that is aligned with the track elements.

11. The method of claim 10, wherein the engaging mechanism comprises a plurality of movable elements located on opposite sides of the shifting mechanism, and each of the plurality of movable elements is alignable with, and extendable into, a corresponding aperture of a plurality of apertures located on opposite sides of the base of the object.

12. The method of claim 11, further comprising operating the first actuator assembly to translate the track elements along the first axis and away from the shifting mechanism to thereby lock the plurality of movable elements into the plurality of apertures.

13. The method of claim 12, wherein each of the track elements is triangular in shape, and the plurality of movable elements is coupled to a biasing mechanism.

14. A system comprising:
a shifting mechanism; and
a lift mechanism comprising:
a platform,
track elements extending along the platform,
a first actuator assembly operable to translate the platform along a first axis that is substantially perpendicular to a second axis to shift an object positioned on the track elements from a lowered position to a raised position, and
a second actuator assembly operable to translate the track elements in coordination along the second axis thereby shifting the object into engagement with the shifting mechanism, wherein as the object positioned on the track elements translates towards the shifting mechanism, the track elements are configured to depress an engaging mechanism located on the shifting mechanism that is aligned with the track elements.

15. The system of claim 14, wherein each track element of the track elements is coupled to a corresponding guide track along which the corresponding track element is translated by the second actuator assembly.

16. The system of claim 14, wherein each track element of the track elements comprises a surface oriented at an angle to the second axis.

17. The system of claim 14, wherein the lift mechanism and the shifting mechanism are operable in coordination at a direction of a control system.

18. The system of claim 17, wherein the engaging mechanism comprises a plurality of movable elements located on opposite sides of the shifting mechanism, and each of the plurality of movable elements is alignable with, and extendable into, a corresponding aperture of a plurality of apertures located on opposite sides of the object.

19. The system of claim 18, wherein the second actuator assembly is operable to translate the track elements along the second axis and away from the shifting mechanism to thereby lock the plurality of movable elements into the plurality of apertures.

20. The system of claim 19, wherein each of the track elements is triangular, and the plurality of movable elements is coupled to a biasing mechanism.

\* \* \* \* \*